United States Patent
Siritzky

(10) Patent No.: US 12,335,834 B2
(45) Date of Patent: *Jun. 17, 2025

(54) SYSTEM FOR SETTING FOCUS MODE ON MULTIPLE USER DEVICES

(71) Applicant: Emma Michaela Siritzky, Potomac, MD (US)

(72) Inventor: Emma Michaela Siritzky, Potomac, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/636,711

(22) Filed: Apr. 16, 2024

(65) Prior Publication Data

US 2025/0056197 A1  Feb. 13, 2025

Related U.S. Application Data

(63) Continuation of application No. 18/117,467, filed on Mar. 5, 2023, now Pat. No. 11,963,082, which is a
(Continued)

(51) Int. Cl.
*H04W 4/90* (2018.01)
*H04M 1/60* (2006.01)
(Continued)

(52) U.S. Cl.
CPC ......... *H04W 4/90* (2018.02); *H04M 1/72436* (2021.01); *H04M 1/72445* (2021.01);
(Continued)

(58) Field of Classification Search
CPC ........... H04W 4/90; H04W 4/40; H04W 4/80; H04W 4/029; H04W 4/48;
(Continued)

(56) References Cited

U.S. PATENT DOCUMENTS 5,692,222 A  *  11/1997  Yamada .................... G02B 7/28
                                                                   396/51
5,852,775 A     12/1998  Hidary
                         (Continued)

FOREIGN PATENT DOCUMENTS

CA        2600116 C   * 11/2011   ............. G06F 21/35
CN    108897483 A     * 11/2018   ........... G06F 1/1616
                         (Continued)

OTHER PUBLICATIONS

USPTO, Non-final Office action for U.S. Appl. No. 16/516,231, filed Jan. 23, 2020.

*Primary Examiner* — Mahendra R Patel
(74) *Attorney, Agent, or Firm* — Siritzky Law, PLLC

(57) ABSTRACT

A communication device comprising: one or more processors and one or more memories supporting communication, the device comprising a plurality of modes, including at least a normal mode and at least one focused mode, wherein the normal mode is distinct from the focused mode, and wherein, when the device is in the focused mode one or more features of the device are at least partially disabled, and wherein the one or more features of the device that are at least partially disabled in the focused mode include one or more features relating to communication supported by the device, wherein the device is configured to: support a user interface (UI) for setting one or more focused time periods, and wherein the device is further configured to switch to the at least one focused mode during the focused time periods.

38 Claims, 21 Drawing Sheets

Related U.S. Application Data continuation of application No. 17/079,446, filed on Oct. 24, 2020, now Pat. No. 11,601,544, which is a continuation of application No. 16/516,231, filed on Jul. 18, 2019, now Pat. No. 10,819,843, which is a continuation of application No. 15/992,124, filed on May 29, 2018, now Pat. No. 10,362,164, which is a continuation of application No. 15/724,176, filed on Oct. 3, 2017, now Pat. No. 9,992,328, which is a continuation of application No. 15/635,264, filed on Jun. 28, 2017, now Pat. No. 9,832,307, which is a continuation of application No. 15/589,518, filed on May 8, 2017, now Pat. No. 9,781,250, which is a continuation-in-part of application No. 15/168,196, filed on May 30, 2016, now Pat. No. 9,699,301.

(60) Provisional application No. 62/168,899, filed on May 31, 2015.

(51) Int. Cl.

| | | |
|---|---|---|
| *H04M 1/72436* | (2021.01) | |
| *H04M 1/72445* | (2021.01) | |
| *H04M 1/72451* | (2021.01) | |
| *H04M 1/72454* | (2021.01) | |
| *H04M 1/72457* | (2021.01) | |
| *H04M 1/72463* | (2021.01) | |
| *H04M 19/04* | (2006.01) | |
| *H04W 4/029* | (2018.01) | |
| *H04W 4/40* | (2018.01) | |
| *H04W 4/48* | (2018.01) | |
| *H04W 4/80* | (2018.01) | |

(52) U.S. Cl.
CPC ... *H04M 1/72451* (2021.01); *H04M 1/72454* (2021.01); *H04M 1/72457* (2021.01); *H04M 1/72463* (2021.01); *H04M 19/04* (2013.01); *H04W 4/40* (2018.02); *H04W 4/80* (2018.02); *H04M 1/6075* (2013.01); *H04W 4/029* (2018.02); *H04W 4/48* (2018.02)

(58) Field of Classification Search
CPC ......... H04M 1/72436; H04M 1/72445; H04M 1/72451; H04M 1/72454; H04M 1/72457; H04M 1/72463; H04M 19/04; H04M 1/6075
USPC ....................................................... 455/418
See application file for complete search history.

(56) References Cited

U.S. PATENT DOCUMENTS

| | | | |
|---|---|---|---|
| 5,862,476 | A | 1/1999 | Hasegawa |
| 5,890,061 | A | 3/1999 | Timm et al. |
| 5,890,067 | A | 3/1999 | Chang et al. |
| 5,963,550 | A | 10/1999 | Hirata et al. |
| 6,014,566 | A | 1/2000 | Owada |
| 6,154,172 | A | 11/2000 | Piccionelli et al. |
| 6,198,927 | B1 | 3/2001 | Wright et al. |
| 6,208,866 | B1 | 3/2001 | Rouhollahzadeh et al. |
| 6,263,190 | B1 | 7/2001 | Mamori et al. |
| 6,311,078 | B1 | 10/2001 | Hardouin |
| 6,353,778 | B1 | 3/2002 | Brown |
| 6,389,287 | B1 | 5/2002 | Smith et al. |
| 6,418,309 | B1 | 7/2002 | Moon et al. |
| 6,496,709 | B2 | 12/2002 | Murray |
| 6,505,046 | B1 | 1/2003 | Baker |
| 6,526,275 | B1 | 2/2003 | Calvert |
| 6,546,257 | B1 | 4/2003 | Stewart |
| 6,580,973 | B2 * | 6/2003 | Leivian ................ G07C 5/0816 701/1 |
| 6,594,483 | B2 | 7/2003 | Nykanen et al. |
| 6,598,034 | B1 | 7/2003 | Kloth |
| 6,600,975 | B2 | 7/2003 | Moriguchi et al. |
| 6,647,257 | B2 | 11/2003 | Owensby |
| 6,647,269 | B2 | 11/2003 | Hendrey et al. |
| 6,650,894 | B1 | 11/2003 | Berstis et al. |
| 6,678,516 | B2 | 1/2004 | Nordman et al. |
| 6,687,497 | B1 | 2/2004 | Parvulescu et al. |
| 6,690,940 | B1 | 2/2004 | Brown et al. |
| 6,728,542 | B2 | 4/2004 | Meda |
| 6,731,925 | B2 | 5/2004 | Naboulsi |
| 6,771,946 | B1 | 8/2004 | Oyaski |
| 6,807,435 | B2 | 10/2004 | Yamashita |
| 6,816,731 | B1 | 11/2004 | Maruyama |
| 6,819,928 | B1 | 11/2004 | Hokao |
| 6,832,093 | B1 | 12/2004 | Ranta |
| 6,847,822 | B1 | 1/2005 | Dennison et al. |
| 6,885,869 | B2 | 4/2005 | Raith |
| 6,922,571 | B1 | 7/2005 | Kinoshita |
| 6,934,547 | B2 | 8/2005 | Suzuki |
| 6,961,561 | B2 | 11/2005 | Himmel et al. |
| 6,973,333 | B1 | 12/2005 | ONeil |
| 6,978,136 | B2 | 12/2005 | Jenniges et al. |
| 7,003,525 | B1 * | 2/2006 | Horvitz .................. H04L 67/52 707/999.102 |
| 7,006,793 | B2 | 2/2006 | Himmel et al. |
| 7,015,831 | B2 | 3/2006 | Karlsson et al. |
| 7,064,656 | B2 | 6/2006 | Belcher et al. |
| 7,072,753 | B2 | 7/2006 | Eberle et al. |
| 7,110,749 | B2 | 9/2006 | Zellner et al. |
| 7,149,627 | B2 | 12/2006 | Ockerse et al. |
| 7,181,228 | B2 | 2/2007 | Boesch |
| 7,242,946 | B2 | 7/2007 | Kokkonen et al. |
| 7,269,627 | B2 | 9/2007 | Knauerhase |
| 7,330,895 | B1 * | 2/2008 | Horvitz ................ H04L 67/306 709/227 |
| 7,359,713 | B1 | 4/2008 | Tiwari |
| 7,359,714 | B2 * | 4/2008 | Parupudi ............... H04W 4/029 455/418 |
| 7,366,548 | B2 | 4/2008 | Del Signore |
| 7,394,791 | B2 | 7/2008 | Proctor, Jr. |
| 7,403,785 | B2 | 7/2008 | Daniels et al. |
| 7,430,724 | B2 | 9/2008 | Othmer |
| 7,590,405 | B2 | 9/2009 | Ewell, Jr. |
| 7,813,741 | B2 | 10/2010 | Hendrey et al. |
| 7,895,013 | B2 | 2/2011 | Dietz et al. |
| 7,898,428 | B2 | 3/2011 | Dietz et al. |
| 7,979,057 | B2 * | 7/2011 | Ortiz .................... G06Q 20/3674 705/14.1 |
| 8,000,689 | B2 | 8/2011 | Featherstone et al. |
| 8,044,794 | B2 | 10/2011 | Chauncey et al. |
| 8,045,976 | B2 | 10/2011 | Kiddie et al. |
| 8,131,205 | B2 | 3/2012 | Rosen |
| 8,160,560 | B2 | 4/2012 | Geyer et al. |
| 8,199,003 | B2 * | 6/2012 | Aaron .................... G08B 21/04 340/539.11 |
| 8,204,649 | B2 | 6/2012 | Zhou et al. |
| 8,217,800 | B2 | 7/2012 | Vander Veen et al. |
| 8,224,353 | B2 | 7/2012 | Wright et al. |
| 8,260,247 | B2 | 9/2012 | Lazaridis et al. |
| 8,270,933 | B2 * | 9/2012 | Riemer ................... H04M 1/67 455/345 |
| 8,280,438 | B2 | 10/2012 | Barbera |
| 8,285,308 | B1 | 10/2012 | Wright et al. |
| 8,335,502 | B2 * | 12/2012 | Oesterling ............. H04W 4/12 455/419 |
| 8,354,937 | B2 | 1/2013 | Vander Veen et al. |
| 8,355,751 | B2 | 1/2013 | Dietz et al. |
| 8,380,161 | B2 | 2/2013 | Ewell, Jr. |
| 8,384,555 | B2 | 2/2013 | Rosen |
| 8,385,880 | B2 | 2/2013 | Ewell, Jr. et al. |
| 8,417,268 | B1 * | 4/2013 | Halferty ................ H04W 4/027 455/410 |
| 8,428,973 | B1 | 4/2013 | Hopkins, III |
| 8,437,729 | B2 | 5/2013 | Ewell, Jr. et al. |
| 8,442,490 | B2 | 5/2013 | Haley |
| 8,442,511 | B2 | 5/2013 | Woods et al. |
| 8,502,642 | B2 | 8/2013 | Vitito |

(56) References Cited

U.S. PATENT DOCUMENTS

| | | |
|---|---|---|
| 8,508,379 B2 | 8/2013 | Vander Veen et al. |
| 8,526,942 B2 | 9/2013 | Kiddie et al. |
| 8,527,140 B2 | 9/2013 | Schwartz et al. |
| 8,532,667 B2 | 9/2013 | Chan et al. |
| 8,532,670 B2 | 9/2013 | Kim et al. |
| 8,565,736 B2 | 10/2013 | Moosavi et al. |
| 8,565,820 B2 | 10/2013 | Riemer et al. |
| 8,606,292 B1 | 12/2013 | Cope et al. |
| 8,626,201 B1 | 1/2014 | Wright et al. |
| 8,634,788 B2 | 1/2014 | Wright et al. |
| 8,634,826 B1 | 1/2014 | Cope et al. |
| 8,666,603 B2 | 3/2014 | Morris |
| 8,686,946 B2 * | 4/2014 | Suggs .......... G06F 3/0421 715/863 |
| 8,688,180 B2 | 4/2014 | Catten |
| 8,738,005 B2 | 5/2014 | Williams et al. |
| 8,761,821 B2 | 6/2014 | Tibbitts et al. |
| 8,773,251 B2 | 7/2014 | Morris |
| 8,781,457 B2 * | 7/2014 | Randazzo .......... H04M 1/72457 455/418 |
| 8,781,491 B2 | 7/2014 | Wright et al. |
| 8,787,936 B2 | 7/2014 | Tibbitts et al. |
| 8,806,225 B2 * | 8/2014 | Park .......... H04M 1/72448 713/193 |
| 8,811,971 B2 | 8/2014 | Corda et al. |
| 8,825,369 B2 | 9/2014 | Jin |
| 8,826,307 B2 | 9/2014 | Nagampalli et al. |
| 8,874,162 B2 | 10/2014 | Schrader et al. |
| 8,890,673 B2 | 11/2014 | Catten et al. |
| 8,893,053 B1 | 11/2014 | Hyde et al. |
| 8,902,054 B2 | 12/2014 | Morris |
| 8,923,826 B2 | 12/2014 | Kiddie et al. |
| 8,942,686 B2 | 1/2015 | Wright et al. |
| 8,942,692 B2 | 1/2015 | Randazzo et al. |
| 8,948,784 B2 | 2/2015 | Chan et al. |
| 8,965,394 B2 | 2/2015 | Rogitz |
| 8,971,927 B2 * | 3/2015 | Zhou .......... H04W 12/08 455/456.3 |
| 8,983,412 B2 | 3/2015 | Featherstone et al. |
| 8,995,945 B2 | 3/2015 | Ewell, Jr. et al. |
| 9,001,149 B2 * | 4/2015 | Sirpal .......... G06F 1/1647 345/619 |
| 9,026,779 B2 * | 5/2015 | Ewell, Jr. .......... G06F 1/3287 455/410 |
| 9,026,780 B2 | 5/2015 | Ewell, Jr. et al. |
| 9,031,584 B2 | 5/2015 | Bahl et al. |
| 9,049,622 B1 | 6/2015 | Cope et al. |
| 9,067,565 B2 | 6/2015 | McClellan et al. |
| 9,076,020 B2 * | 7/2015 | Ahlstrom .......... G06F 21/6218 |
| 9,087,222 B2 | 7/2015 | Bahl et al. |
| 9,094,533 B2 | 7/2015 | Geyer et al. |
| 9,100,794 B2 | 8/2015 | Ewell, Jr. |
| 9,107,093 B2 | 8/2015 | Aksamit |
| 9,150,154 B2 | 10/2015 | Miller et al. |
| 9,152,609 B2 | 10/2015 | Schwartz et al. |
| 9,154,908 B2 | 10/2015 | Bahl et al. |
| 9,161,310 B2 | 10/2015 | Bahl et al. |
| 9,167,418 B1 | 10/2015 | Tuluca |
| 9,179,327 B2 | 11/2015 | Bahl et al. |
| 9,185,525 B2 | 11/2015 | Dietz et al. |
| 9,194,937 B2 | 11/2015 | Bahl et al. |
| 9,204,267 B2 | 12/2015 | Sturges et al. |
| 9,226,104 B2 * | 12/2015 | Schlesener .......... H04M 1/72436 |
| 9,307,071 B2 | 4/2016 | Neitzel et al. |
| 9,332,393 B2 | 5/2016 | Bahl et al. |
| 9,357,496 B2 | 5/2016 | Bahl et al. |
| 9,386,447 B2 | 7/2016 | Tibbitts et al. |
| 9,420,077 B1 | 8/2016 | Nakiranda |
| 9,423,932 B2 * | 8/2016 | Kroupa .......... G06F 3/0483 |
| 9,451,447 B2 | 9/2016 | Tibbitts et al. |
| 9,462,110 B1 | 10/2016 | Schlesener et al. |
| 9,462,438 B2 * | 10/2016 | Warr .......... H04W 4/16 |
| 9,482,737 B2 | 11/2016 | Bahl et al. |
| 9,487,122 B2 | 11/2016 | Murata et al. |
| 9,503,887 B1 | 11/2016 | Tuluca |
| 9,553,970 B2 | 1/2017 | Pothul et al. |
| 9,560,187 B2 | 1/2017 | Evan |
| 9,571,629 B2 | 2/2017 | Kadous |
| 9,591,437 B2 | 3/2017 | Bahl et al. |
| 9,699,301 B1 | 7/2017 | Siritzky |
| 9,781,250 B2 | 10/2017 | Siritzky |
| 9,832,307 B1 | 11/2017 | Siritzky |
| 9,965,208 B1 * | 5/2018 | Roohparvar .......... G06F 3/0626 |
| 9,992,328 B2 | 6/2018 | Siritzky |
| 10,031,659 B2 * | 7/2018 | Chun .......... G06F 9/44505 |
| 10,048,856 B2 * | 8/2018 | Vranjes .......... G06F 3/0488 |
| 10,362,164 B2 | 7/2019 | Siritzky |
| 10,819,843 B2 | 10/2020 | Siritzky |
| 2002/0168981 A1 | 11/2002 | Meda |
| 2002/0198004 A1 | 12/2002 | Heie |
| 2003/0114160 A1 | 6/2003 | Verkama et al. |
| 2003/0129995 A1 | 7/2003 | Niwa et al. |
| 2003/0137408 A1 | 7/2003 | Breiner |
| 2003/0143988 A1 | 7/2003 | Jamadagni |
| 2004/0023670 A1 | 2/2004 | Merheb |
| 2004/0092253 A1 | 5/2004 | Simonds et al. |
| 2004/0156333 A1 | 8/2004 | Bush |
| 2004/0166878 A1 | 8/2004 | Erskine et al. |
| 2004/0198332 A1 | 10/2004 | Lundsgaard |
| 2004/0203900 A1 | 10/2004 | Cedervall et al. |
| 2004/0248589 A1 | 12/2004 | Gwon et al. |
| 2004/0253963 A1 | 12/2004 | Park et al. |
| 2005/0037760 A1 | 2/2005 | Maruyama |
| 2005/0070298 A1 | 3/2005 | Caspi et al. |
| 2005/0096026 A1 | 5/2005 | Chitrapu et al. |
| 2005/0119002 A1 | 6/2005 | Bauchot et al. |
| 2005/0153680 A1 | 7/2005 | Yoshioka et al. |
| 2005/0255874 A1 | 11/2005 | Stewart-Baxter et al. |
| 2005/0261011 A1 | 11/2005 | Scott |
| 2005/0264404 A1 | 12/2005 | Franczyk et al. |
| 2006/0040640 A1 | 2/2006 | Thompson et al. |
| 2006/0046765 A1 | 3/2006 | Kogure |
| 2006/0052109 A1 | 3/2006 | Ashman et al. |
| 2006/0058036 A1 | 3/2006 | Watanabe et al. |
| 2006/0099940 A1 | 5/2006 | Pfleging et al. |
| 2006/0099959 A1 | 5/2006 | Staton et al. |
| 2006/0099969 A1 | 5/2006 | Staton et al. |
| 2006/0104297 A1 | 5/2006 | Buyukkoc et al. |
| 2006/0116807 A1 | 6/2006 | Hijikata |
| 2006/0148490 A1 | 7/2006 | Bates et al. |
| 2006/0160523 A1 | 7/2006 | Erskine et al. |
| 2006/0211412 A1 | 9/2006 | Vance |
| 2006/0217130 A1 | 9/2006 | Rowitch et al. |
| 2006/0229058 A1 | 10/2006 | Rosenberg |
| 2006/0234746 A1 | 10/2006 | Bouat |
| 2006/0246918 A1 | 11/2006 | Fok et al. |
| 2006/0293037 A1 | 12/2006 | Signore |
| 2007/0016643 A1 | 1/2007 | Boss et al. |
| 2007/0026850 A1 | 2/2007 | Keohane et al. |
| 2007/0069030 A1 | 3/2007 | Sauerwein et al. |
| 2007/0072616 A1 | 3/2007 | Irani |
| 2007/0082678 A1 | 4/2007 | Himmelstein |
| 2007/0178911 A1 | 8/2007 | Baumeister et al. |
| 2007/0287474 A1 | 12/2007 | Jenkins et al. |
| 2008/0057942 A1 | 3/2008 | Woods et al. |
| 2008/0061988 A1 | 3/2008 | Mock et al. |
| 2008/0076418 A1 | 3/2008 | Beyer, Jr. |
| 2008/0198141 A1 | 8/2008 | Lee et al. |
| 2008/0299954 A1 | 12/2008 | Wright et al. |
| 2008/0305779 A1 | 12/2008 | Wright et al. |
| 2008/0305808 A1 | 12/2008 | Chan et al. |
| 2009/0029744 A1 | 1/2009 | Boersma |
| 2009/0040102 A1 | 2/2009 | Medina Herrero et al. |
| 2009/0128286 A1 | 5/2009 | Vitito |
| 2009/0163243 A1 | 6/2009 | Barbera |
| 2009/0221279 A1 | 9/2009 | Rutledge |
| 2009/0253454 A1 * | 10/2009 | Sampson .......... H04M 1/72457 455/550.1 |
| 2009/0275281 A1 | 11/2009 | Rosen |
| 2009/0318169 A1 | 12/2009 | Rogitz |
| 2010/0029270 A1 | 2/2010 | Kiddie et al. |
| 2010/0041383 A1 | 2/2010 | Fournier |
| 2010/0083244 A1 | 4/2010 | Bothwell et al. |

(56) References Cited

U.S. PATENT DOCUMENTS

| | | |
|---|---|---|
| 2010/0105356 A1 | 4/2010 | Ghazarian et al. |
| 2010/0130182 A1 | 5/2010 | Rosen |
| 2010/0201478 A1 | 8/2010 | Veen et al. |
| 2010/0210254 A1 | 8/2010 | Kelly et al. |
| 2010/0216509 A1* | 8/2010 | Riemer ............ H04M 1/72463 455/557 |
| 2010/0302179 A1 | 12/2010 | Ahn et al. |
| 2010/0323657 A1 | 12/2010 | Barnard et al. |
| 2010/0330958 A1 | 12/2010 | Corda et al. |
| 2011/0009107 A1* | 1/2011 | Guba .................... H04W 4/027 455/418 |
| 2011/0015998 A1 | 1/2011 | Hirschfeld |
| 2011/0021234 A1 | 1/2011 | Tibbitts et al. |
| 2011/0028139 A1 | 2/2011 | Odom |
| 2011/0039581 A1 | 2/2011 | Cai et al. |
| 2011/0065375 A1 | 3/2011 | Bradley |
| 2011/0093161 A1 | 4/2011 | Zhou et al. |
| 2011/0109468 A1 | 5/2011 | Hirschfeld et al. |
| 2011/0117903 A1 | 5/2011 | Bradley |
| 2011/0159842 A1 | 6/2011 | Vander Veen et al. |
| 2011/0184247 A1 | 7/2011 | Contant et al. |
| 2011/0239110 A1 | 9/2011 | Garrett et al. |
| 2011/0295458 A1 | 12/2011 | Halsey-Fenderson |
| 2012/0022872 A1* | 1/2012 | Gruber .................... G06F 40/35 704/270.1 |
| 2012/0157070 A1 | 6/2012 | Jain et al. |
| 2012/0157165 A1* | 6/2012 | Kim .................... G06F 21/6218 455/566 |
| 2012/0166997 A1* | 6/2012 | Cho .................... G06F 21/6218 715/778 |
| 2012/0220284 A1* | 8/2012 | Tadayon ............... H04W 4/023 455/418 |
| 2012/0223836 A1 | 9/2012 | Moller |
| 2012/0237908 A1 | 9/2012 | Fitzgerald et al. |
| 2012/0244840 A1 | 9/2012 | Vander Veen et al. |
| 2012/0244883 A1 | 9/2012 | Tibbitts et al. |
| 2012/0299814 A1* | 11/2012 | Kwon .................... G06F 9/451 345/156 |
| 2012/0309388 A1 | 12/2012 | Moosavi et al. |
| 2013/0046421 A1 | 2/2013 | El Fassi et al. |
| 2013/0050131 A1 | 2/2013 | Lee et al. |
| 2013/0137413 A1 | 5/2013 | Jayachandran |
| 2013/0165140 A1 | 6/2013 | Bahl et al. |
| 2013/0179840 A1 | 7/2013 | Fisher et al. |
| 2013/0238540 A1* | 9/2013 | O'Donoghue ..... G06Q 30/0269 706/46 |
| 2013/0274997 A1 | 10/2013 | Chien |
| 2013/0303143 A1* | 11/2013 | Schrader ........... H04M 1/72412 455/418 |
| 2014/0067702 A1 | 3/2014 | Rathod |
| 2014/0080471 A1 | 3/2014 | Coskun et al. |
| 2014/0148126 A1 | 5/2014 | Kim |
| 2014/0152430 A1 | 6/2014 | Ohki |
| 2014/0172190 A1 | 6/2014 | Kalinadhabhotla et al. |
| 2014/0235159 A1 | 8/2014 | Komistek |
| 2014/0248864 A1 | 9/2014 | Rangarajan et al. |
| 2014/0256305 A1* | 9/2014 | Ginis ...................... H04W 4/50 455/418 |
| 2014/0323121 A1 | 10/2014 | Kim et al. |
| 2015/0039880 A1 | 2/2015 | Aminzade |
| 2015/0058723 A1* | 2/2015 | Cieplinski ........... G06F 3/04847 715/702 |
| 2015/0081058 A1 | 3/2015 | Oliver et al. |
| 2015/0116212 A1* | 4/2015 | Freed .................. G06F 21/6245 345/156 |
| 2015/0304830 A1* | 10/2015 | Ni ........................ H04W 4/029 455/404.2 |
| 2015/0326522 A1 | 11/2015 | Pu et al. |
| 2016/0088469 A1 | 3/2016 | Racha et al. |
| 2016/0144716 A1 | 5/2016 | Kim |
| 2016/0188181 A1* | 6/2016 | Smith ................. G06F 3/04886 715/765 |
| 2016/0213323 A1 | 7/2016 | Proud |
| 2016/0357305 A1 | 12/2016 | Wells et al. |
| 2016/0357404 A1 | 12/2016 | Alonso Ruiz et al. |

FOREIGN PATENT DOCUMENTS

| | | | |
|---|---|---|---|
| EP | 2222063 A1 | 8/2010 | |
| EP | 2469816 A1 | 6/2012 | |
| EP | 2469817 A1 | 6/2012 | |
| EP | 2530918 A1 | 12/2012 | |
| EP | 2530977 A2 | 12/2012 | |
| EP | 2786263 A2 | 10/2014 | |
| GB | 2498008 A | 7/2013 | |
| WO | 9730873 A1 | 8/1997 | |
| WO | 0173673 A2 | 10/2001 | |
| WO | WO-0225970 A1 * | 3/2002 | ......... H04M 1/6075 |
| WO | 200916540 A2 | 2/2009 | |
| WO | 2009105666 A1 | 8/2009 | |
| WO | 2011038265 A2 | 3/2011 | |
| WO | 2011088579 A1 | 7/2011 | |
| WO | 2013120723 A1 | 8/2013 | |
| WO | 2015035334 A1 | 3/2015 | |
| WO | 2015069747 A1 | 5/2015 | |

* cited by examiner

SYSTEM FOR SETTING FOCUS MODE ON MULTIPLE USER DEVICES

RELATED APPLICATIONS

This application is a continuation of U.S. patent application Ser. No. 18/117,467, filed Mar. 5, 2023, issued as U.S. Pat. No. 11,963,082, on Apr. 16, 2024, which is a continuation of U.S. patent application Ser. No. 17/079,446, filed on Oct. 24, 2020, issued as U.S. Pat. No. 11,601,544 on Mar. 7, 2023, which is a continuation of application Ser. No. 16/516,231, filed Jul. 18, 2019, issued as U.S. Pat. No. 10,819,843 on Oct. 27, 2020, which is a continuation of U.S. patent application Ser. No. 15/992,124, filed May 29, 2018, issued as U.S. Pat. No. 10,362,164 on Jul. 23, 2019, which is a continuation of U.S. patent application Ser. No. 15/724,176, filed Oct. 3, 2017, issued as U.S. Pat. No. 9,992,328, which is a continuation of application Ser. No. 15/635,264, filed Jun. 28, 2017, U.S. Pat. No. 9,832,307, which is a continuation of application Ser. No. 15/589,518, filed May 8, 2017, U.S. Pat. No. 9,781,250, which is a continuation of application Ser. No. 15/168,196, filed May 30, 2016, U.S. Pat. No. 9,699,301, which claims the benefit of application No. 62/168,899, filed May 31, 2015, the entire contents of each of which are hereby fully incorporated herein by reference for all purposes. U.S. application Ser. No. 15/635,264 is a continuation of application Ser. No. 15/168,196. U.S. application Ser. No. 15/724,176 is a continuation of application Ser. No. 15/589,518, which is a continuation of application Ser. No. 15/168,196, which claims the benefit of application No. 62/168,899 filed May 31, 2015.

BACKGROUND OF THE INVENTION

Copyright Statement

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to controlling the use of computer devices, and, more particularly to systems, methods and devices to control use of computer devices for periods of time in order to avoid distractions.

Background

Mobile devices such as mobile or cell phones, laptop computers, and the like are ubiquitous, and their use among teenagers and young adults has become widespread. Many teenagers use mobile phones almost all the time. The devices are used for all sorts of reasons, e.g., to communicate with friends, teachers, family, etc., to access social network sites (e.g., Facebook®, Twitter®, etc.), to listen to music, to watch videos, etc. Mobile computing devices have permeated teenagers' lives and their constant use has become a distraction. In the case of students doing homework or studying for exams the distraction may just cause poor grades at school. In the case of someone using a mobile computing device while driving a car, the distraction may prove harmful or even fatal to the driver and to others.

Many parents try to take away their children's mobile devices or ask them to turn them off for periods of time or while driving. And many users (including, especially teenagers) would like to use their mobile devices less, especially while they are studying or doing their homework or driving, but the devices are sometimes quite addictive. Additionally, even when a user has decided to not use their device for a period of time, they are often easily distracted by others contacting them via their devices.

It is therefore desirable and an object of the invention to provide a way for a user to disable aspects of their mobile devices so that they are not disturbed or tempted by the devices.

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

BRIEF DESCRIPTION OF THE DRAWINGS

Various other objects, features and attendant advantages of the present invention will become fully appreciated as the same becomes better understood when considered in conjunction with the accompanying drawings, provided by way of non-limiting example, in which like reference characters designate the same or similar parts throughout the several views, and wherein.

DETAILED DESCRIPTION OF THE PRESENTLY PREFERRED EXEMPLARY EMBODIMENTS

Glossary

As used herein, unless used otherwise, the following terms or abbreviations have the following meanings:

API means Application Program(ing) Interface;
GUI means graphical user interface (UI);
OS means operating systems;
UI means user interface; and
UX means user experience.

A "mechanism" refers to any device(s), process(es), routine(s), service(s), or combination thereof. A mechanism may be implemented in hardware, software, firmware, using a special-purpose device, or any combination thereof. A mechanism may be integrated into a single device, or it may be distributed over multiple devices. The various components of a mechanism may be co-located or distributed. The mechanism may be formed from other mechanisms. In general, as used herein, the term "mechanism" may thus be considered to be shorthand for the term device(s) and/or process(es) and/or service(s).

Description

Background

As used herein the term "mobile device" refers to any device that may connect to other users via a communications network. A mobile device may be a cell phone, a tablet computer, a laptop computer, a smart watch, or the like. A mobile device may refer to devices that operate together with other mobile devices (e.g., a smart watch such as Apple's iWatch® or the like, alone or in conjunction with a mobile phone such as an iPhone® or the like). The system is not limited by the manner in which the device connects to the network or to other devices. For example, the connection to the network may be via a cellular network and/or via a network such as the Internet. It should be appreciated that aspects of the systems and methods described herein are not limited to mobile devices, and that they may be applicable to any computing device including desktop computers and the like.

Figure 1A:
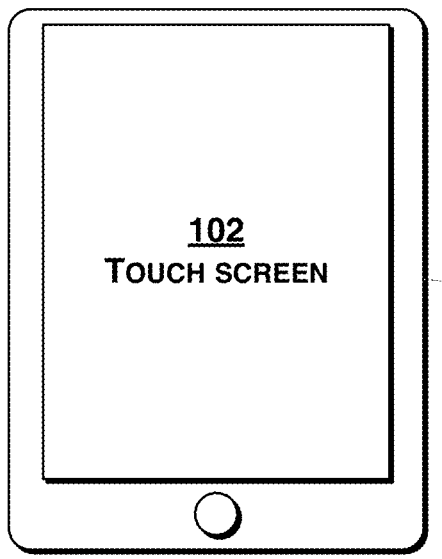
FIGS. 1A to 1C show aspects of computer devices on which embodiments of the invention operate.
Figure 1B:
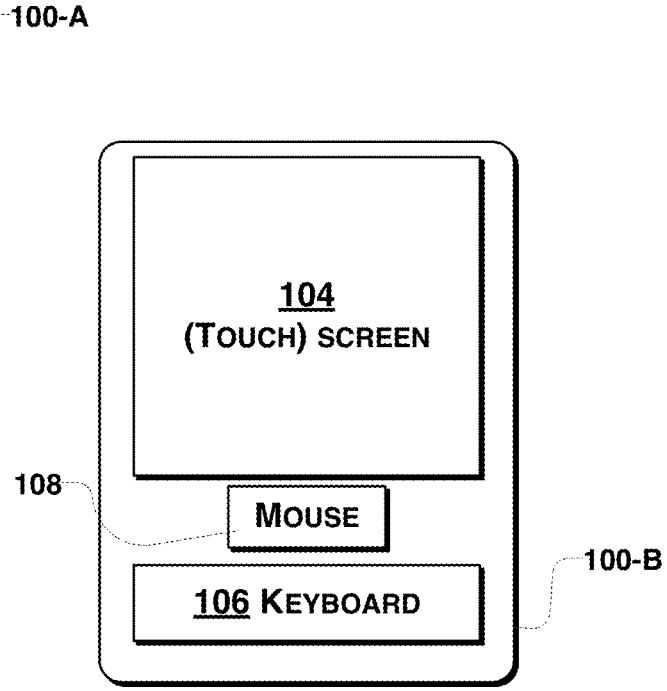
Figure 1C:
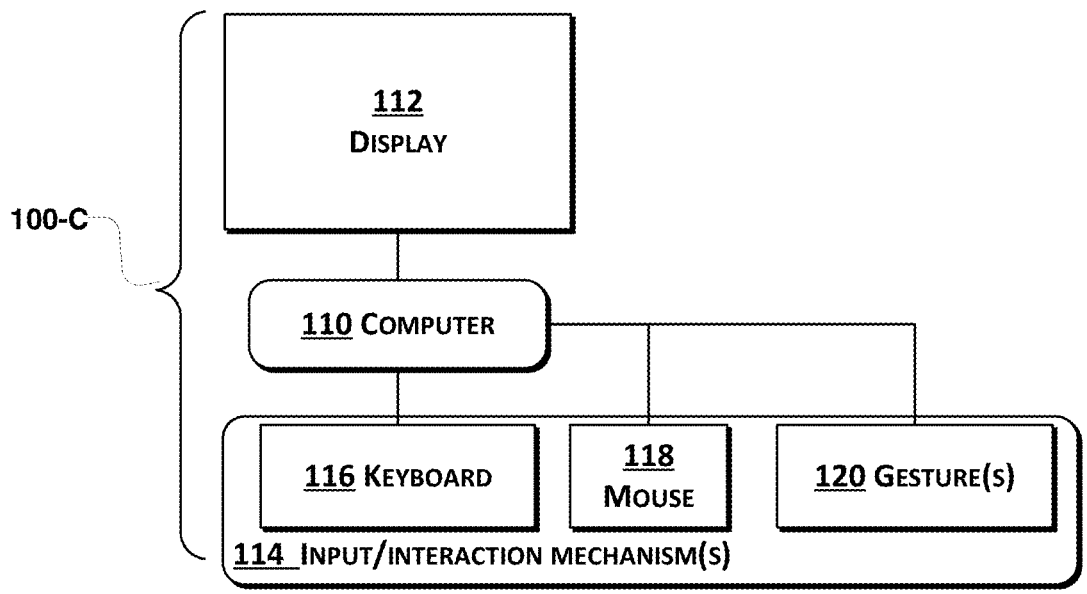

A typical mobile device (e.g., a smartphone or the like) is shown in FIGS. 1A to 1C.

Devices used by or in connection with embodiments hereof may be any kind of computing device, including mobile devices (e.g., phones, tablets, watches, wearable devices, etc.), computers (e.g., desktops, laptops, etc.), and the like. Each device preferably includes at least at one display and at least some input mechanism. The display and input mechanism may be separate (as in the case, e.g., of a desktop computer and detached keyboard and mouse), or integrated (as in the case, e.g., of a tablet device such as an iPad or the like). The term "mouse" is used here to refer to any component or mechanism that may be used to position a cursor on a display and, optionally, to interact with the computer. A mouse may include a touchpad that supports various gestures. A mouse may be integrated into or separate from the other parts of the device. A device may have multiple displays and multiple input devices.

FIGS. 1A-1C show examples of devices 100a, 100b, and 100c, respectively, that may be used with or according to exemplary embodiments hereof. Exemplary device 100a (FIG. 1A) has an integrated display and input mechanism in the form of touch screen 102. The device 100a is integrated into a single component, e.g., a smartphone, a tablet computer, or the like. The device 100a may support a software (or virtual) keyboard (VKB). Exemplary device 100b (FIG. 1B) is also integrated into a single component, but, in addition to a screen 104 (which may be a touch screen), the device includes a keyboard 106 and an integrated mouse 108 (e.g., an integrated device such as a trackball or track pad or the like that supports movement of a cursor on the screen 104). The keyboard may be a hardware keyboard (e.g., as in the case of a BlackBerry® phone). The screen 104 may be a touch screen and may support a virtual keyboard (VKB).

The exemplary device 100c (FIG. 1C) comprises multiple components, including a computer 110, a computer monitor or display 112, and input/interaction mechanism(s) 114, such as, e.g., a keyboard 116 and/or a mouse 118, and/or gesture recognition mechanism 120. Although the various components of device 100c are shown connected by lines in the drawing, it should be appreciated the connection between some or all of the components may be wireless. Some or all of these components may be integrated into a single physical device or appliance (e.g., a laptop computer), or they may all be separate components (e.g., a desktop computer). As another example, a device may be integrated into a television, an automobile dashboard, a set-top box, or the like. Thus, e.g., with reference again to FIG. 1C, the display 112 may be a display or monitor integrated into the dashboard of an automobile and the computer 110 may be integrated fully or partially into the monitor. In this example, the input/interaction mechanisms 114 (e.g., keyboard 116 and mouse 118) may be separate components connecting to the computer 110 via wired and/or wireless communication (e.g., via Bluetooth® or the like). In some cases, the input/interaction mechanisms 114 may be fully or partially integrated into a remote-control device or the like. These input/interaction mechanisms 114 may use virtual keyboards generated, at least in part, by the computer 110 on the display 112. When the device is used in connection with an automobile, some or all of the interaction mechanisms may be integrated with the vehicle's controls, e.g., on the steering wheel and/or the dashboard.

It should be appreciated that these exemplary devices are shown here to aid in this description and are not intended to limit the scope of the system in any way. Other devices may be used and are contemplated herein.

Figure 2:
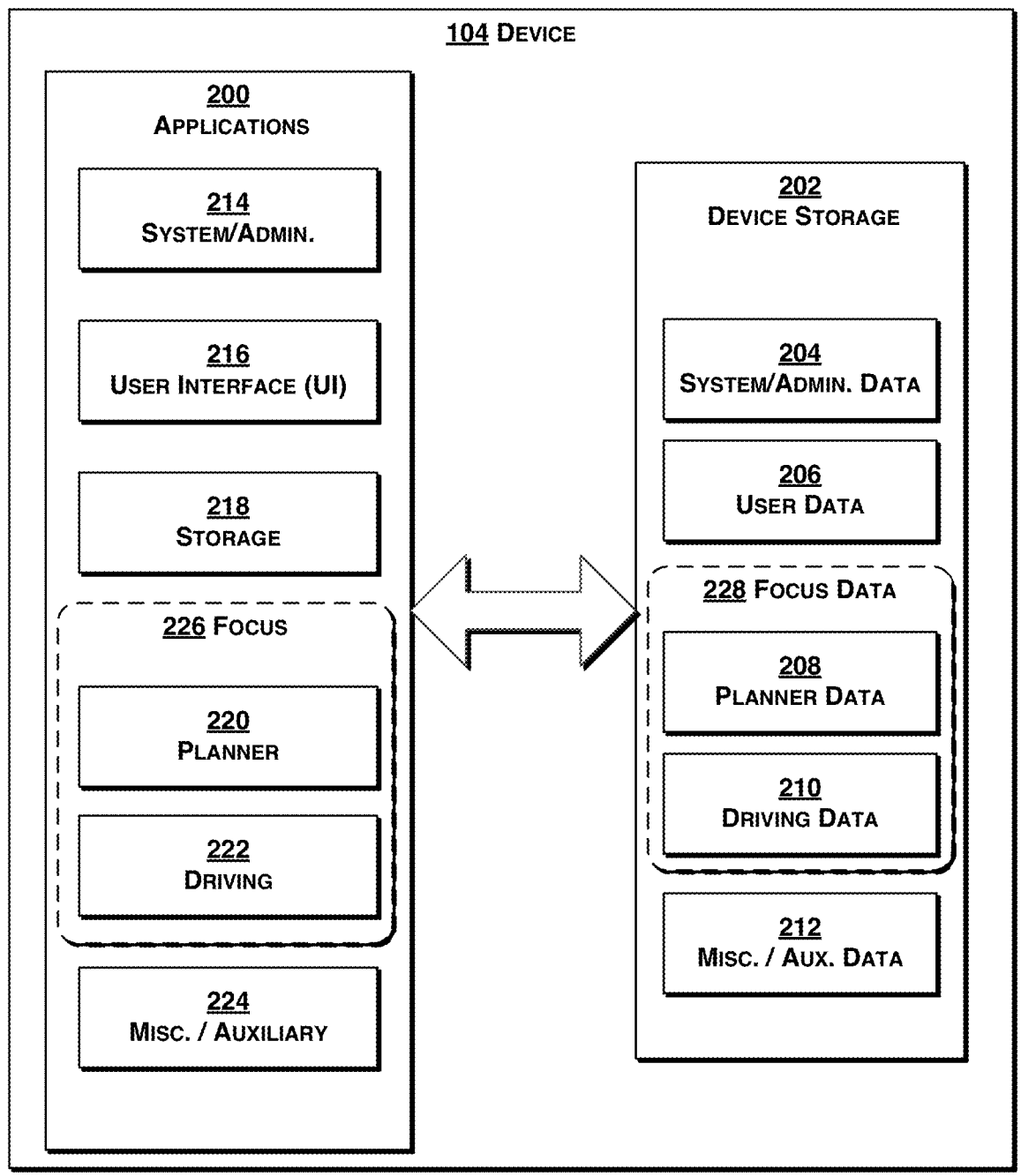
FIG. 2 shows aspects of a computer devices according to exemplary embodiments hereof.

FIG. 2 shows logical aspects of a typical device (e.g., 104c, FIG. 1C), including device/client application(s)/mechanism(s) 200 interacting and operating with device/client storage 202. Device/client storage 202 may include system/administrative data 204, user data 206, planner data 208, driving data 210, and other miscellaneous/auxiliary data 212. The device/client application(s)/mechanism(s) 200 may include system/administrative application(s)/mechanism(s) 214, user interface (UI) application(s)/mechanism(s) 216, storage application(s)/mechanism(s) 218, planning application(s)/mechanism(s) 220, focused driving application(s)/mechanism(s) 222, and other miscellaneous application(s)/mechanism(s) 224.

Computing devices are described in greater detail below.

The planning application(s)/mechanism(s) 220 may also be referred to herein as the planner 220 or the planner application or planner app 220. The focused driving application(s)/mechanism(s) 222 may also be referred to herein as the driving application or driving app 222 or the focused driving application or app 222.

The categorization of data in storage 202 is made for the purposes of aiding this description, and those of ordinary skill in the art will realize and appreciate, upon reading this description, that different and/or other categorizations of the data may be used. It should also be appreciated any particular data may categorized in more than one way. Similarly, it should be appreciated that different and/or other categorizations of the device/client application(s)/mechanism(s) 200 may be used and furthermore, that any particular application may be categorized in more than one way.

In addition, it should be appreciated that some of the applications/mechanisms, although shown as separate components in the drawings, may be integrated into a single component. For example, the planning application(s)/mechanism(s) 220 and focused driving application(s)/mechanism(s) 222 may be integrated into a single focus application/mechanism 226, as shown by the dashed lines in FIG. 2. Similarly, the planner data 208 and the driving data 210 may be integrated, e.g., focus data 228 as shown by the dashed lines in FIG. 2. The focus application(s)/mechanism(s) 226 may also be referred herein as the focus application or focus app 226.

Device States

Various aspects of a device and its use may cause it to be a distraction to a user, and, depending on what the user is doing at the time of the distraction, the distraction may be more or less harmful or dangerous. For example, it is well known that texting while driving is very distracting and consequently very dangerous. On the other hand, texting while studying for a test, while distracting, may not be dangerous.

Generally, use of a device is considered a distraction when the user should be doing something other than using the device. For example, the device may be a mobile phone or the like and the device may include applications (e.g., a chat program, a texting program, or the like) that may be distracting to the user. Different applications (also known as "apps") on the device may be more or less distracting, depending on when they are used and on what the user is doing when they are used.

The inventor has realized that in order to reduce the distraction from a computer device, and thereby to allow the user to focus on other tasks, it is useful, possibly necessary, to selectively block the user's access to parts of the device. In the case of a laptop computer or the like, this blocking may involve selectively blocking the use of certain apps on the device. The inventor realized that is desirable to provide a way for a user to disable aspects of their computers/mobile devices so that they are not disturbed or tempted by the devices.

In the case of a mobile phone or the like, blocking may involve selectively blocking some of the external communications aspects of the device. In this way the user may not only be blocked from initiating or participating in outgoing communications (from the device to other users) but may also be blocked from receiving communications (or notifications of communications) from other users.

Figure 3:
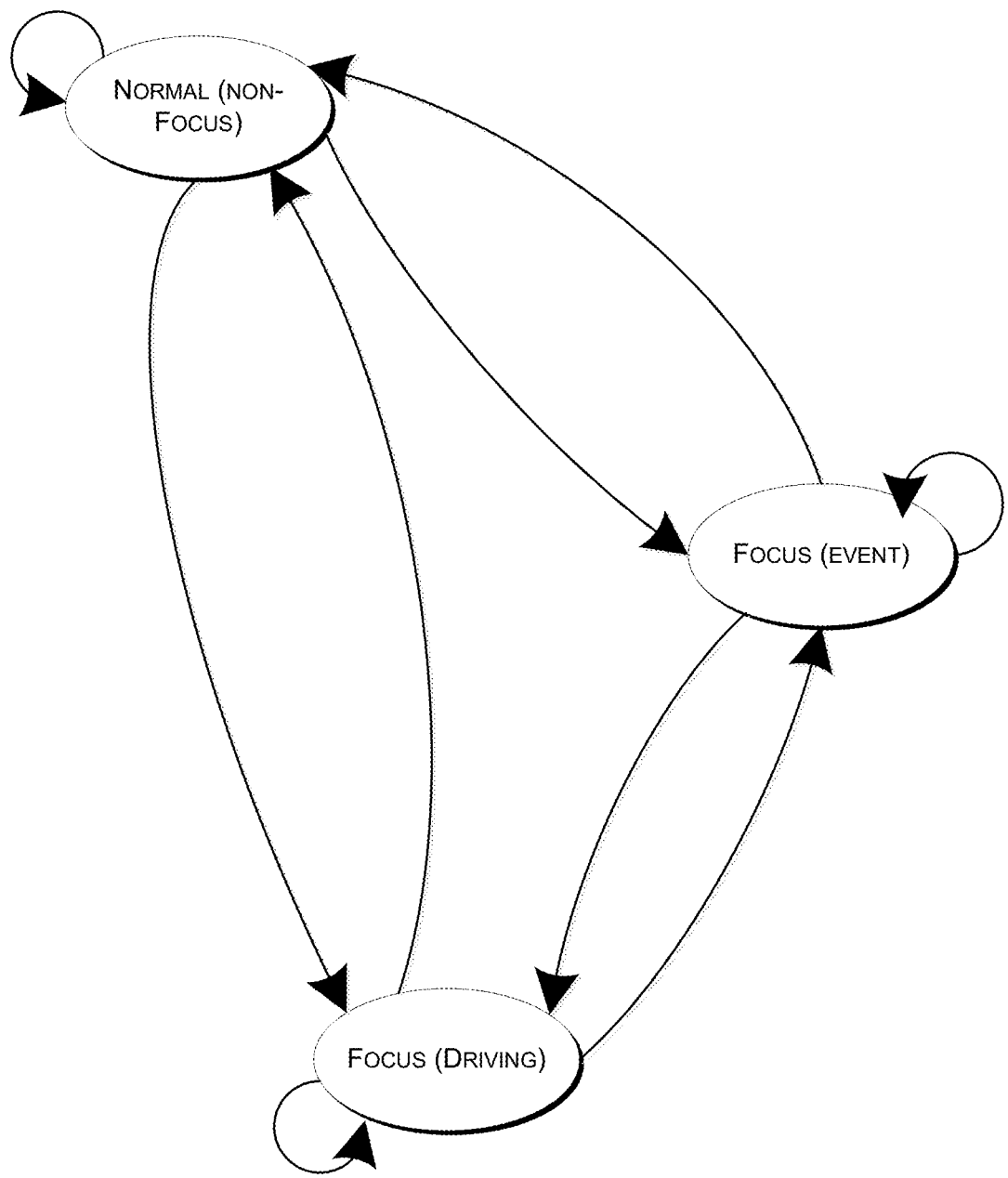
FIG. 3 depicts states of a device according to exemplary embodiments hereof.

For the purposes of this description a device may be considered to be in a number of different states or modes. For the purposes of this description the states or modes are referred to as "normal" (or non-focused), "focused (event)," and "focused (driving)". These three exemplary or modes are shown in a state transition diagram in FIG. 3. Those of ordinary skill in the art will realize and appreciate, upon reading this description, that different and/or other state names may be used and that additional or fewer states may be used. For example, a particular embodiment may only have two states: "normal" and "focused," with no distinction between degrees of focused states.

In the "normal" state a device operates without restriction (or, at least without restriction imposed by the focus applications.

In a "focused" mode or state, the device operates with some restrictions. For example, in some exemplary embodiments hereof, in a "focused (event)" state or mode, the device is in a "do not disturb" mode in which the user is not notified of incoming messages or calls and in which the user cannot use various applications, make outgoing calls or send outgoing messages. Regardless of the mode, a user is never prevented from making emergency calls. Focused modes may restrict one or more of: some or all apps on the device; incoming and/or messages (texts, voice calls, etc.); notifications, etc.

In some embodiments, in a focused mode (e.g., drive focused or event focused) certain features of the user's device(s) may be modified or at least partially disabled. These features may include one or more of: (a) at least some incoming notifications (e.g., text messages, phone calls, messages from other applications, etc.); (b) at least some outgoing calls or messages (i.e., the ability to make at least some outgoing calls or send outgoing messages such as text messages or the like); and (c) at least some applications on the user's device(s) (e.g., social network apps such as Facebook®, Twitter®, Snapchat®, Skype®, and the like).

Various devices already have some form of blocking (e.g., "airplane" mode restricts all cellular communications). Preferred embodiments hereof may make use of at least some device-specific and/or built-in restrictions.

In some exemplary embodiments hereof, the "focused (driving)" mode is more restrictive than the "focused (event)" mode, with all device use being restricted (except for emergency use).

It should be appreciated that when there is more than on "focused" mode, the different "focused" modes may form a hierarchy of successively more restricted modes. In other cases, multiple "focused" modes may be distinct but not hierarchical.

Transition between the states/modes is discussed in greater detail below.

The Planner

The inventor realized that many students use planners to plan out their days, including, specifically, their studying and homework time. It is during those times that people want and need to be focused, and it is during that time that people do not want to be distracted or disturbed. The inventor realized that it would be helpful and useful to fully or partially disable aspects of computer devices (e.g., smart phones, laptop computers, etc.) during periods when focus is required. In this way a person need not be tempted or distracted by their devices.

Accordingly, embodiments hereof may include a planner mechanism (e.g., a planner application 220 in FIG. 2) operating on the device. The planner mechanism interacts with data, including planner data 208, stored and maintained in the device storage. Using the planner 220, a user is able to set time periods during which focused attention is required (e.g., for homework, studying, reading, etc.). The planner 220 includes a user interface that supports entry of events and allows the user thereof to set the status of the user's devices during those events. When the planner application 220 is running, the user may use the user interface to set up a plan for any period of time, although the interface preferably displays the events for a day.

Figure 4A:
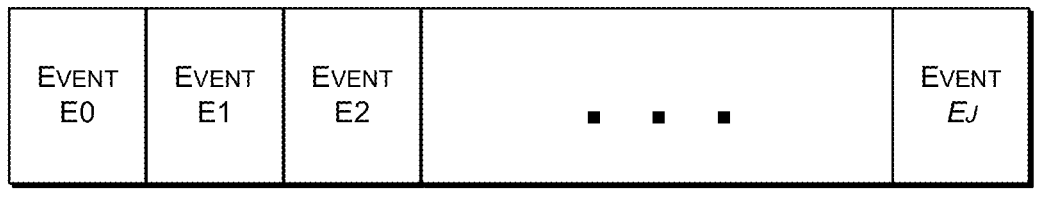
FIGS. 4A to 4B depict aspects of data structures according to exemplary embodiments hereof.
Figure 4B:
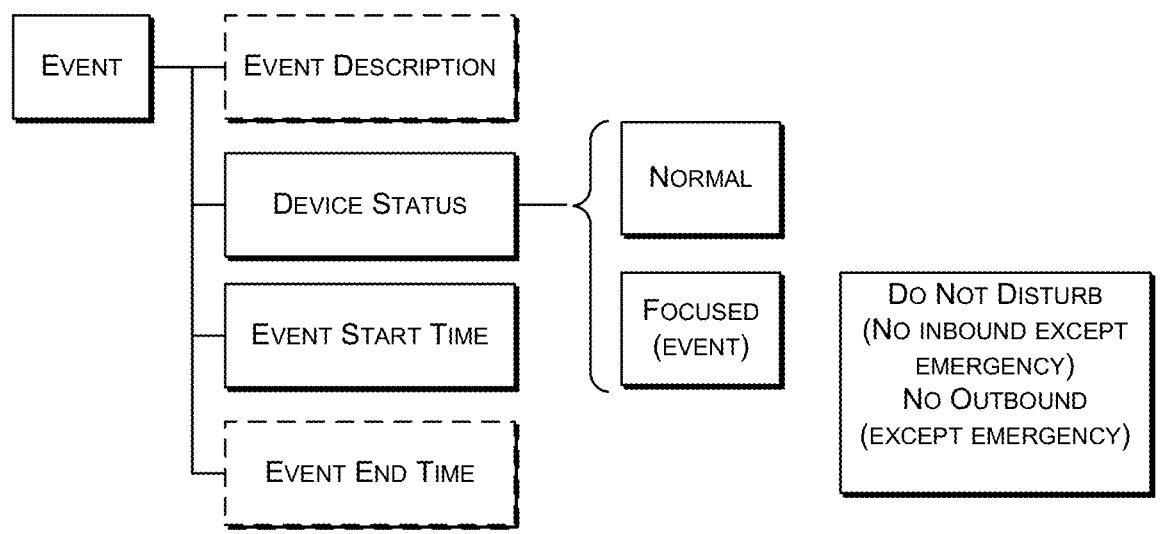

With reference to the exemplary data structures in FIGS. 4A-4B, a user's, the planner 220 may store (in planner data 208) a series of events (E0, E1, E2, . . . Ej) 400, each event having an event description, a device status (being the desired status of the user's device(s) during the event), and an event start time. An event may have an event end time and/or a duration (the end time being computable from the start time and duration). In presently preferred embodiments the device status is either normal (corresponding to the "normal" state in FIG. 3) or "focused (event)" (corresponding to the "focus (event)" state in FIG. 3). Preferably the series of events are non-overlapping in time.

Operation of the planner 220 is described here with reference to the flowcharts in FIGS. 5A-5J.

Figure 5A:
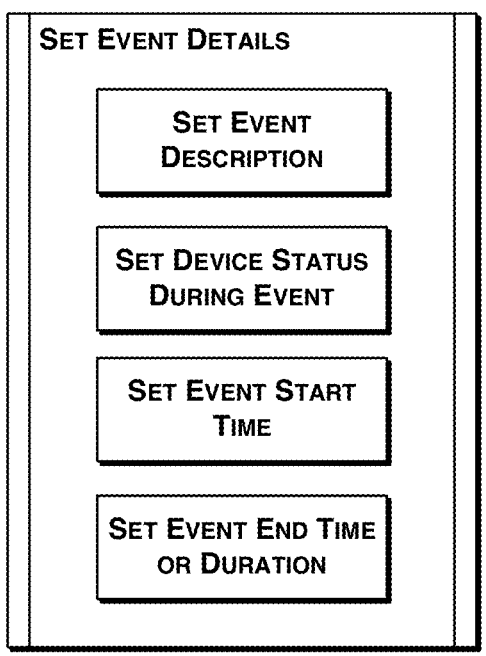
FIGS. 5A to 5J are flowcharts showing operation of devices according to exemplary embodiments hereof.
Figure 5B:
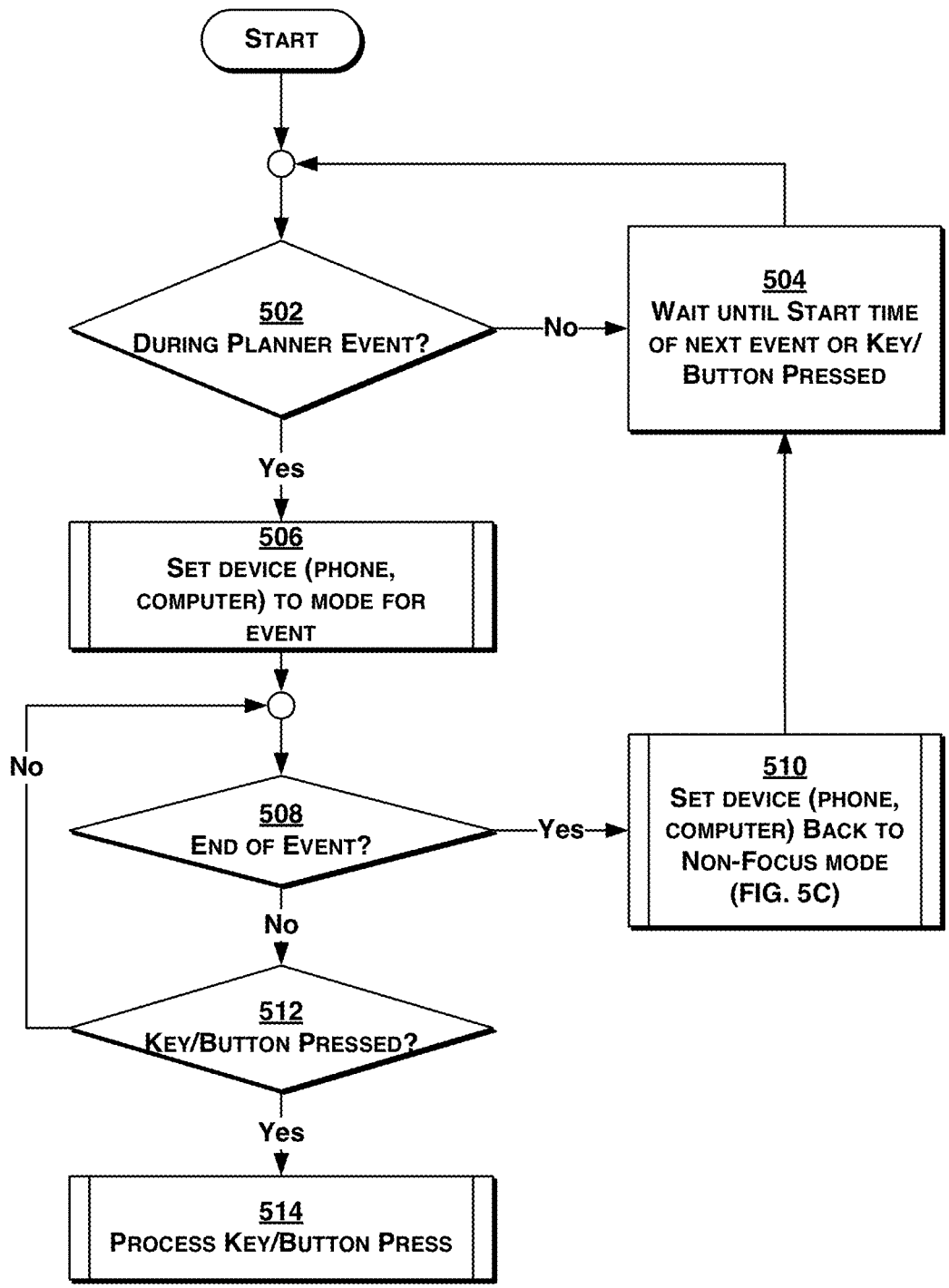
Figure 5C:
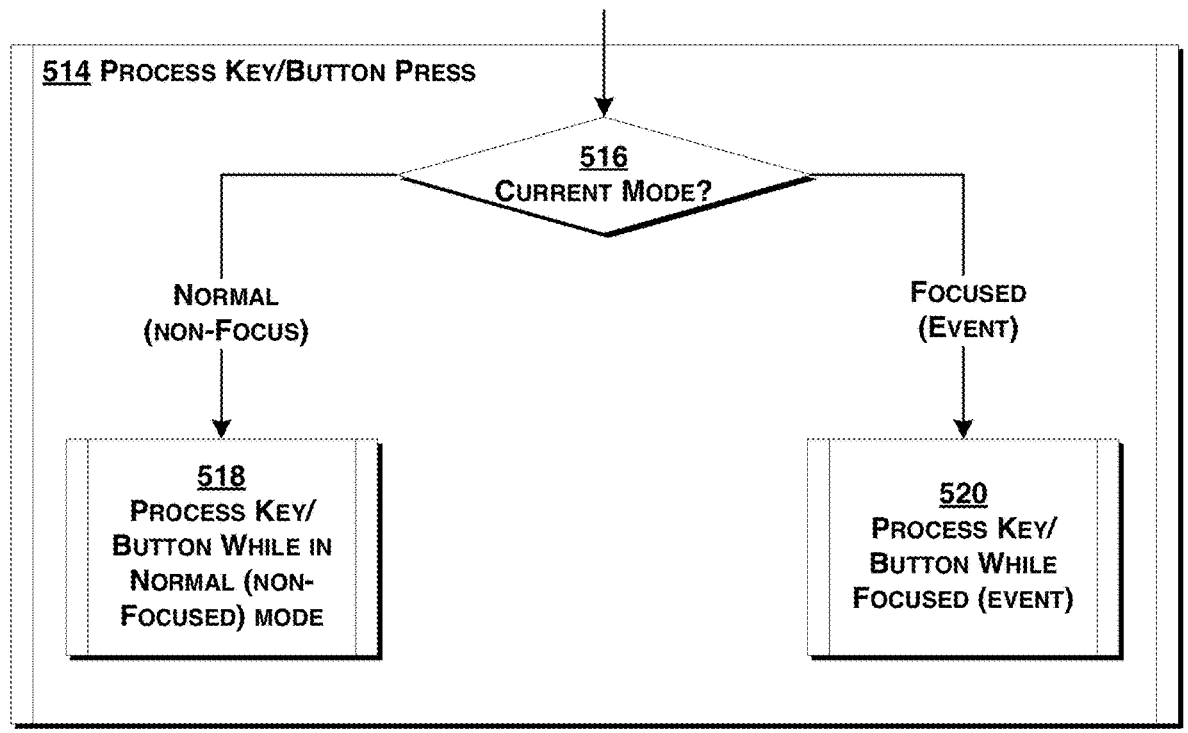
Figure 5D:
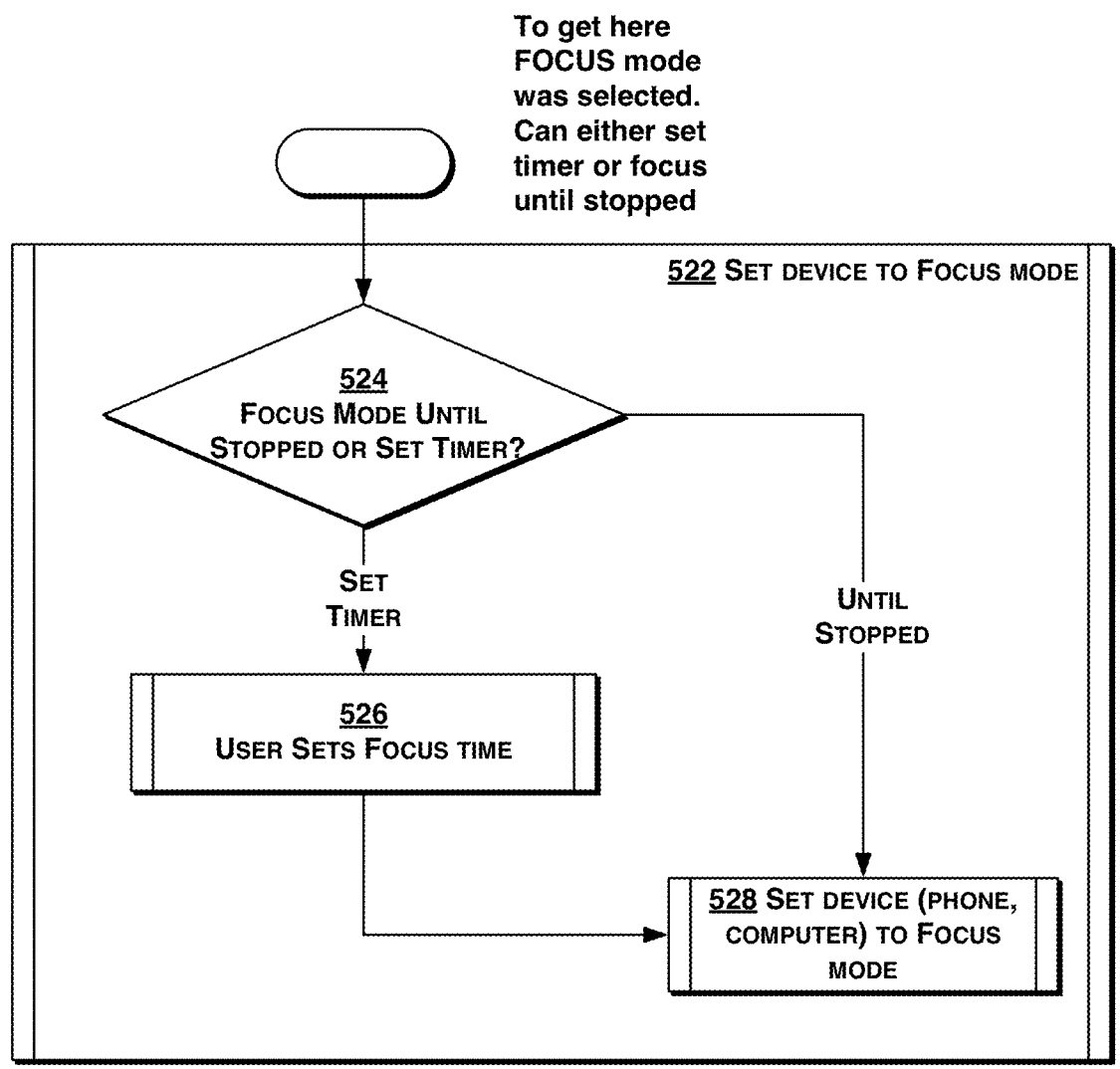
Figure 5E:
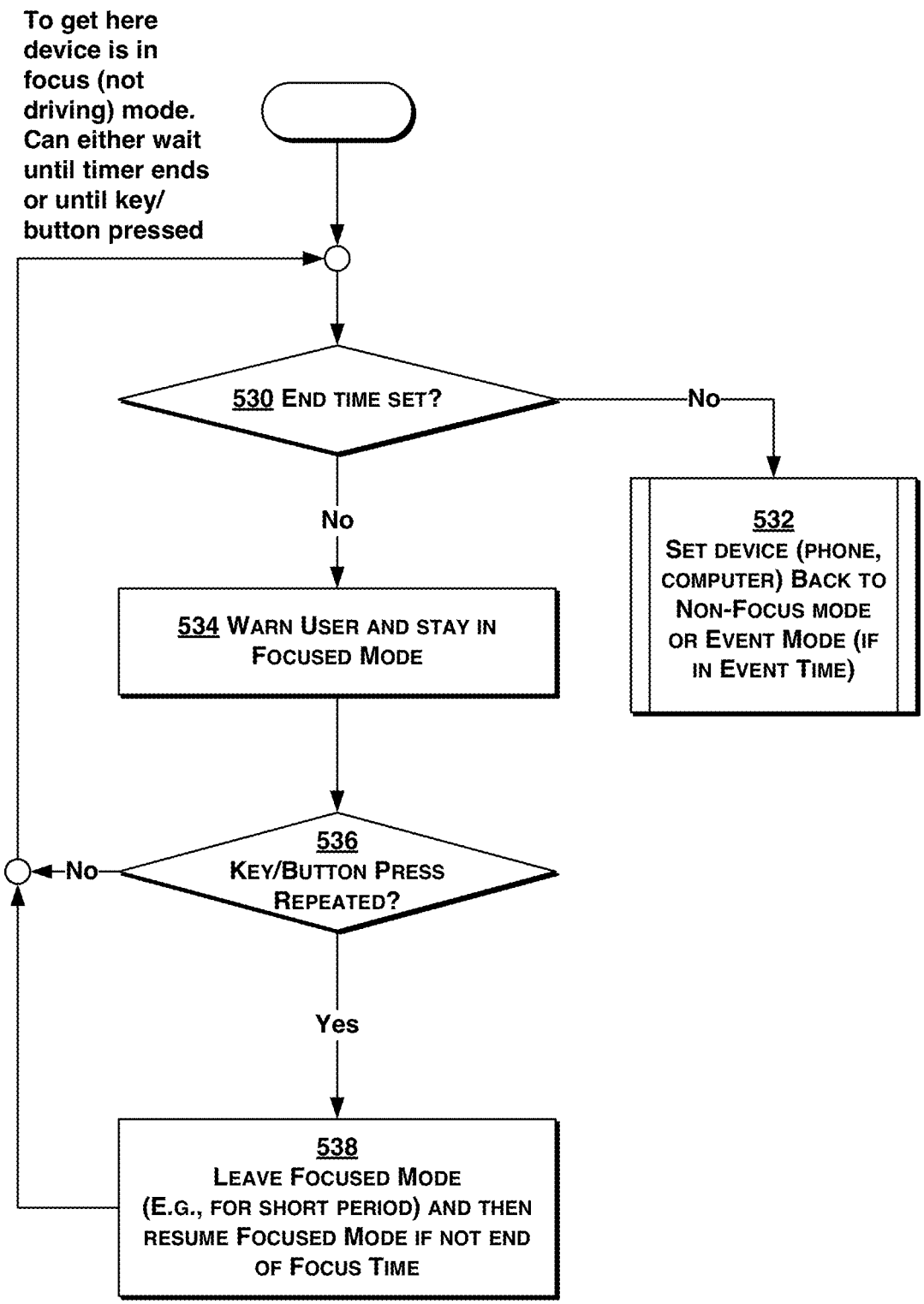
Figure 5F:
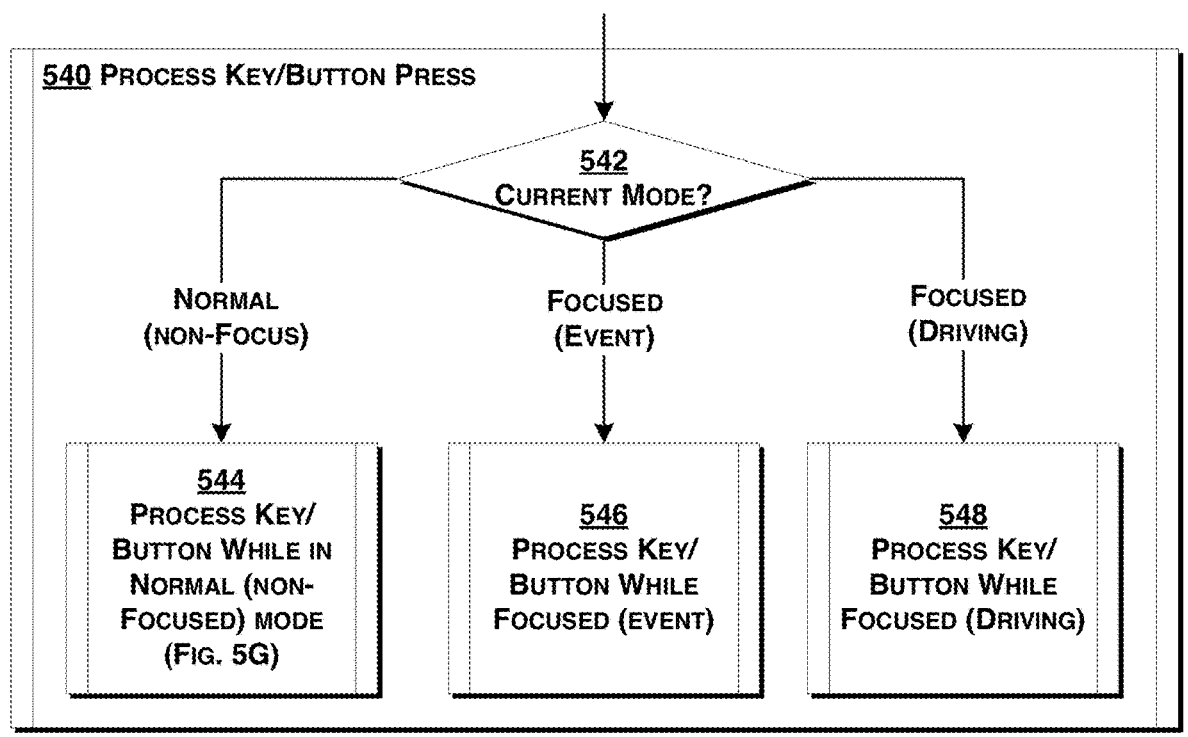

With reference to FIG. 5A, using the user interface provided by the planner 220, the user may set event details for any number of events. For each event the user may set an event description (e.g., "Study French"), set an event start time (e.g., 4:00 PM), and set a device status during the event (e.g., "Normal" or "Focused"). The default status may be either "Normal" or "Focused", and the user is not required to set a device status if the default is desired. For the purposes of this description, an event for which the device status is set to "focused" may be referred to as a focused event, and an event for which the device status is set to "normal" may be referred to as a normal event.

In preferred embodiments hereof the user's planner data 208 may be shared (e.g., via a "cloud" account) with multiple of the user's devices. In this manner the device status of an event may be applied to more than one of the user's devices.

Using the user interface provided by the planner 220, the user may set the end time or duration of an event. If the duration is set, then the end time may be calculated from the start time and duration. If the user does not specify an end time, then the planner will continue in the status for this event until either another event starts or the user interrupts the planner.

The user interface of the planner 220 may provide a way (e.g., a "FOCUS" button on the screen of the device) that allows a user to selectively enter a focus mode without setting event data. For example, if the user selects (e.g., presses) that "FOCUS" button then the user's device(s) will go into "focused" mode. This feature may be implemented as an event with no description or end time, and with a start time being the time at which the "FOCUS" button was selected. The event may be inserted into the user's event sequence 400. Thus, selecting the "FOCUS" button effectively creates an event with no description, with the start time being the current time, with the device status being "focused (event)" and with no end time. The system may end "focus" mode when a user selection is made (as described below) or when another event begins. In some embodiments the user may set a timer or duration for the "focus" mode when the button is set. As overlapping events are preferably not permitted, an ad hoc focused event (caused by pressing the "FOCUS" button) preferably ends when the next event in the sequence begins.

The term "button," as used herein throughout, may refer to a virtual button or region presented on the screen of a device by the user interface (UI), or it may refer to a physical button of the device. In some cases, a physical device button may be set to function as an application-specific button while the application is running on the device. The terms "press" or "pressing," when used in connection with a virtual button (e.g., one presented by the GUI), may refer to any appropriate manner of selecting the UI region corresponding to the button. For example, a user may "press" a virtual (GUI) button by touching or in some way selecting the region of the display corresponding to that button.

The user interface of the planner 220 may provide a way for a user to selectively terminate the current focus mode. For example, the user interface may provide a button or the like on the screen of the device that, when selected by the user, causes the device to go back to "normal" mode. The planner 220 may try to discourage the user from leaving the focus mode during an event. For example, in some embodiments the user may be queried about whether they really want to end the focus mode. For example, the UI may inform the user of the remaining focus time (based on the current event's end time) and ask the user if they can wait that amount of time before leaving the focused mode. In some embodiments, if the event has an end time set, selecting the "Normal Mode" (or "Un-FOCUS") button on the user interface may cause the device to go into normal mode for a short period of time (e.g., 1 minute or 2 minutes or 5 minutes) and then to resume in focus mode until the end of the event.

In some cases, the user may be required to enter a code or password in order to leave focus mode.

In operation the planner 220 traverses the user's event list 400, setting the user's device(s) to the device status corresponding to the current event. With reference to the flow chart in FIG. 5B, when the planner 220 starts, it determines (at 502) whether the current time (obtained from the device's clock) is during a planner event. This may be determined from the start and end times of the events in the user's event list 400 in the focus data 228 (in planner data 208) in the device storage 202.

If the planner 220 determines that the current time is not within an event, then it waits until the start time of the next event or until a key or button is pressed (at 504). On the other hand, if the planner 200 determines (at 502) that the current time is during a planner event (e.g., event Ek—also referred to as the current event), then (at 506) the user's device is set to the corresponding mode for that event. Thus, if the mode for the current event is "normal" then the device is set to (or left in) normal mode. If the mode for the current event is "focused" then the device is set to (or left in) focused mode.

During an event the planner 220 checks (at 508) whether the current event has ended. An event may end when its end time is reached. If the current event has ended then the planner sets the user's device (e.g., phone, computer, etc.) back to the non-focused (normal) mode (at 510) and then waits for the start of the next event (at 504).

If the current event has not ended the planner determines (at 512) whether a key or button on the device has been pressed. If no key or button has been pressed, then the planner 220 repeats the "end of event" check (at 508). If the planner 220 determines that a key or button has been pressed, then the planner processes that key/button press (at 514).

As described, the planner 220 may process a button press while idle (i.e., while waiting for an event at 504) or during an event (at 514). In either case, the current device mode or status may be normal or focused. With reference to the flowchart in FIG. 5C, when a button is pressed the planner 220 processes that press (at 514) by first determining the current device mode (at 516). If the current mode is "normal" (i.e., non-focused) then the planner 220 processes current key/button while in normal mode (at 518), otherwise, if the current mode is "focused" then the planner 220 processes the current key/button while in the focused mode (at 520).

For the processing when the current mode is "normal" (at 518), if the current mode is normal then the button pressed will either be to create or edit an event or to enter focus mode. If the button is to create or edit an event, then the user interface provides the appropriate screen(s) and interface to create a new event or edit a current event. If the button selected is to enter the focus mode, then, with reference to the flowchart in FIG. 5D, the user may (at 522, 524) either set a timer or stay in focus mode until stopped (i.e., until the event ends or the application is stopped). As noted above, the planner 220 essentially creates a new (ad hoc) event with a start time corresponding to the current time and with an end time being either set by the user or left open (or set to the start time of the next event in the user's event list 400). The device status for this ad hoc event is set to "focused." If the user sets a focus timer (at 526), then the user interface of the planner 220 may provide the user with an interface that allows/enables the user to set a duration or end time for the focus mode. The time set by the user is used to set the event end time (although preferably the ad hoc event cannot end after the start time of the next event in the user's event list.

The device is set to focus mode (at 528).

For the processing when the current mode is "focused" (at 520 in FIG. 5C): either the user pressed a "STOP" button to end the focus or some other key. First the device checks (at 530) whether the user set an end time for the current focus event. If no end time was set, then the user may exit the focus mode (at 532). If the current time is in an event time, then the device mode is set to the mode of the current event (at 532).

If an event end time was set and the user pressed the button during the event time, then the planner application 220 warns the user and may stay in the focused mode (at 534). If the user repeats the button press (at 536, to leave the focused mode) then the device may leave the focused mode (at 538). In some embodiments the device may leave the focused mode for a short period of time (e.g., 2 minutes, 5 minutes, etc.) and then resume in focused mode if not yet at the end of the focused mode for the current event. It should be appreciated that other "termination" options are possible and contemplated herein. For example, as noted earlier, in some embodiments the user may be required to enter a password or key in order to terminate the focused mode. In some embodiments the user may be required to press the "stop" button or a combination of buttons more than once in order to exit the focused mode. In some embodiments a single press of the "stop" button may be sufficient to exit the focused mode.

At any time, regardless of the mode of the device, the user may always have access to emergency features (e.g., "911" dialing and the like). No matter how strict the focus mode, a device's emergency features are never turned off.

Driving

The dangers of texting while driving are well known, and there is a need for some way of discouraging texting and other mobile device uses while driving. The inventor has realized that driving a vehicle is a kind of event that requires focus, albeit more focus than required when studying or reading.

As noted above, a device may have more than one "focus" state, and the focus states may have different degrees of restriction on device use.

Accordingly, in some embodiments hereof, the focus application(s) 226 may include focused driving application(s)/mechanism(s) 222 that may use driving data 210 (see FIG. 2). The focus application(s)/mechanism(s) 226 may include either or both the focused driving application(s)/mechanism(s) 222 and the planner application(s)/mechanism(s) 220. For the remainder of this description the planner 220 and the focused driving app 222 are described together, although those of ordinary skill in the art will realize and appreciate, upon reading this description, that either the focused driving application(s)/mechanism(s) 222 or the planner application(s)/mechanism(s) 220 may be present without the other. In other words, the focus application(s)/mechanism(s) 226 of particular embodiments hereof may include only the focused driving application(s)/mechanism(s) 222 or only the planner application(s)/mechanism(s) 220.

In presently preferred embodiments hereof a user enters the focused driving mode by pressing a driving mode button presented on the user interface by the focused driving application(s)/mechanism(s) 222. An example interface is shown in FIG. 6A-6I, and the button processing (540) is described with reference to the flowchart in FIG. 5F.

When a button is pressed, first focus application(s) 226 determines the current mode of the device (at 542). If the device is in normal (non-focused) mode then the button/key is processed at 544 (see FIG. 5G), if the device is in event-focused mode then the button/key is processed at 546 (similar to the processing at 520 in FIG. 5C). If button/key is pressed while in driving-focused mode, then the button/key is processed at 548.

Figure 5G:
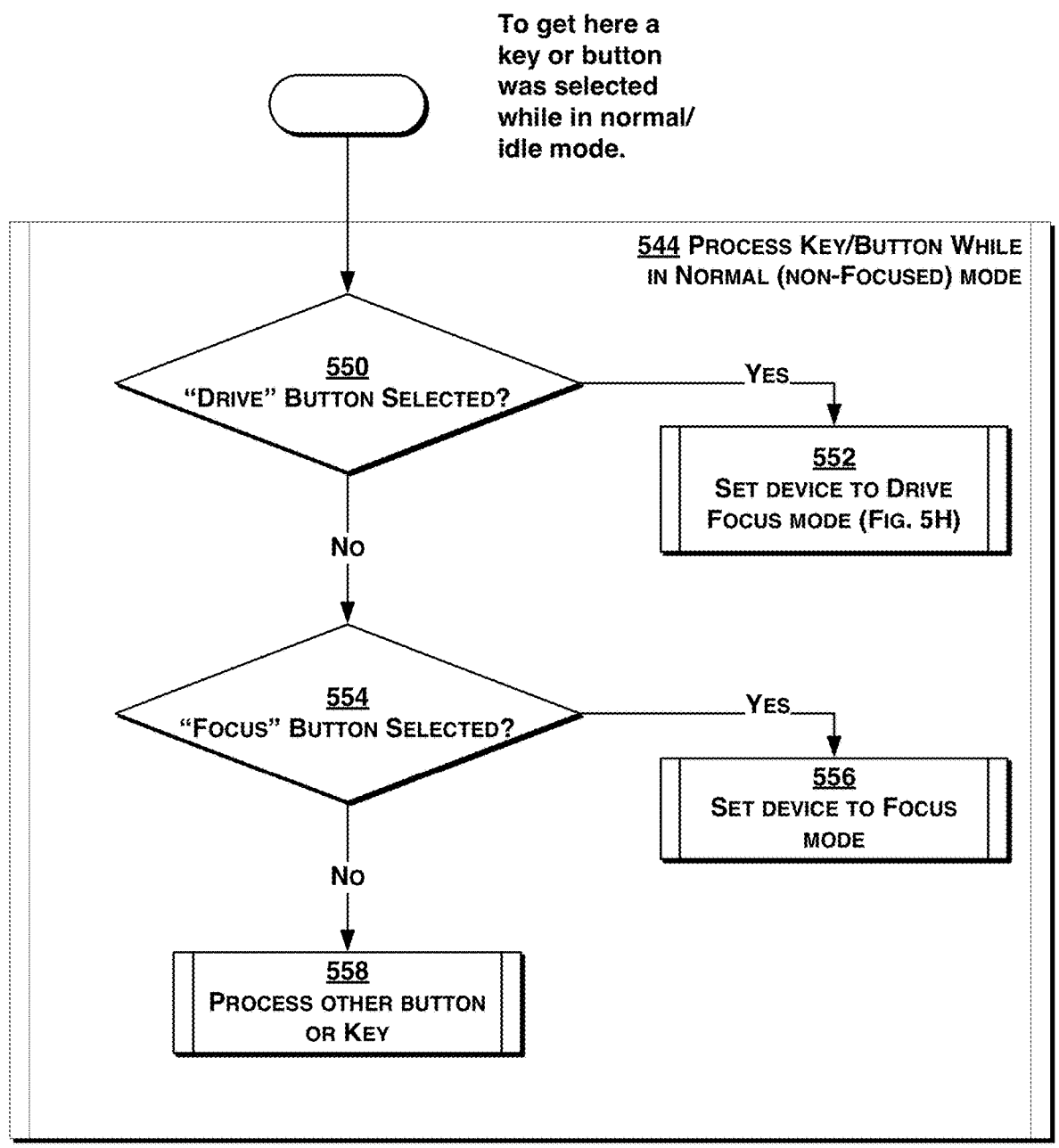
Figure 5H:
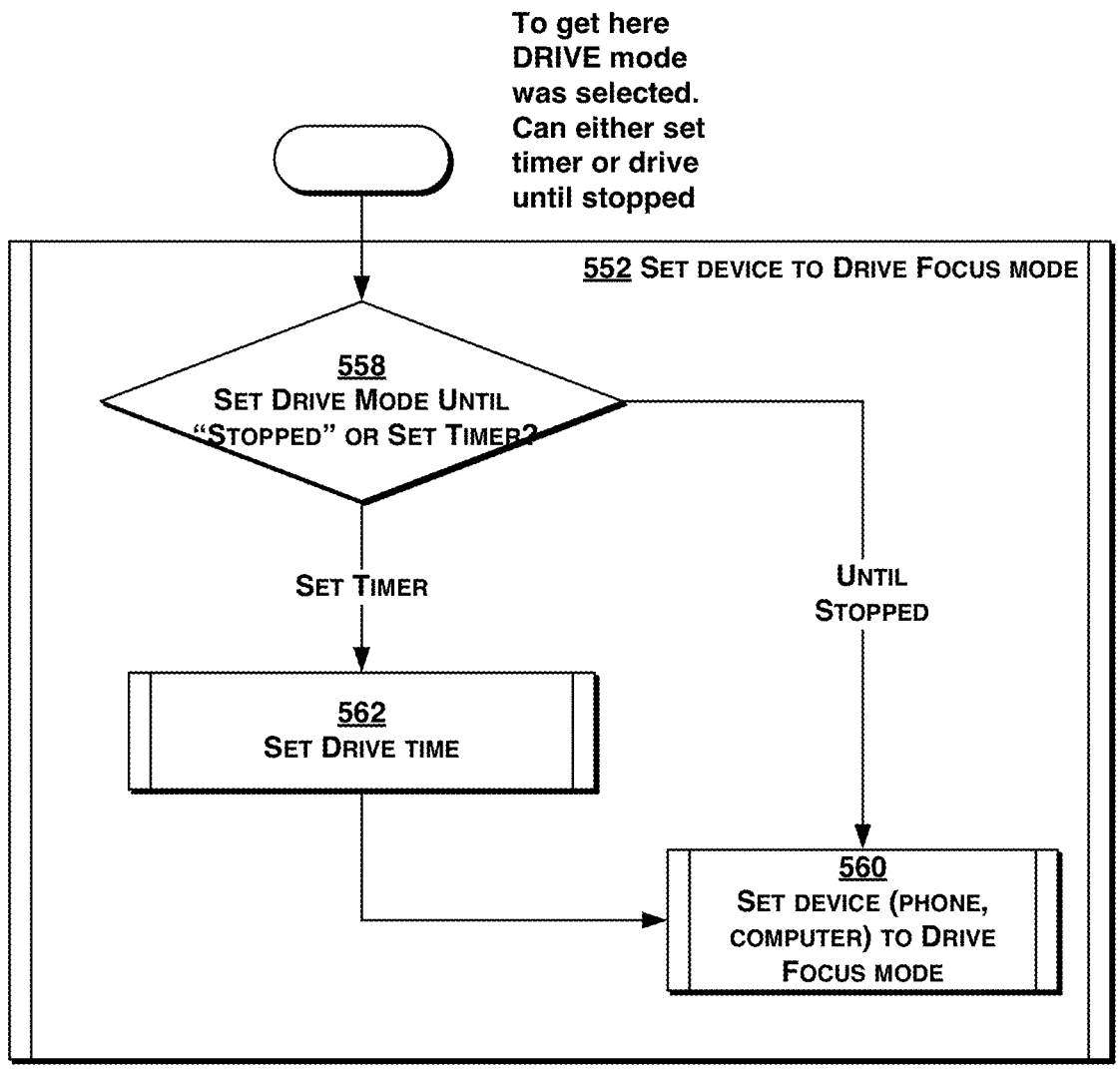

With reference to the flowchart in FIG. 5G, showing processing of a key/button while in the normal (or idle) mode: if the "DRIVE" button was selected (at 550) then the device is set to drive focus mode (at 552), otherwise, if the "FOCUS" (not driving) button was selected (at 554) then the device is set to focus mode (not driving), otherwise some other key or button was selected and is processed (at 556). Note that drive focus mode corresponds to the "focus (driving)" state of FIG. 3, whereas "focus mode (not driving)" corresponds to the "focus (event)" state of FIG. 3.

With reference now to the flowchart in FIG. 511, if the user selects drive mode, then the device can either be set to stay in drive mode for a period of time or until stopped (at 558). If the user selects (at 558) to stay in drive mode until stopped then the device is set to drive focus mode (at 560). If the user selects (at 558) to set a drive time, then the user may set the drive time (at 562) and then the device is set to drive focus mode (at 560). The drive time, if set, may be set as an actual time or as a duration. In either case, the application may create a new event with a start time of the current time and an appropriate end time (depending on the user's selection). If the end time is left open (i.e., the device is set to drive focused until stopped) then the end time may be set to a time in the future that will not be reached before the vehicle is actually stopped (e.g., 1 day). In such case the device will not switch modes based on other future events in the user's event list. For example, if the current time is 1 PM and the user enters "drive focused" mode, until stopped, and the user has an event in her event list at 1:30 PM (to 2:30 PM) with a status of "event focused", then if the user is still driving at 1:31 PM then the device should preferably stay in "drive focused" mode and not switch to "event focused." If the user ends drive mode before 2:30 PM (during the event time) then the device should preferably enter the "event focused" mode corresponding to the 1:30 to 2:30 PM event.

In preferred embodiments hereof the device stays in drive mode until stopped, and the timer option is not provided.

To set the device into drive focus mode (at 560) the device is set to the restrictions corresponding to the "focus (driving)" state. Under these restrictions the device is preferably set to a "do not disturb" state where the user does not receive notifications of incoming messages (e.g., texts) or phone calls and the user cannot send any texts or messages or use any applications or make any outgoing calls (except for emergency calls). In some embodiments the focused driving application may provide the user with a way to set up and maintain a list of acceptable parties for which incoming phone call notifications may be received. For example, a user may put her parents on such a list so that the user will be notified of incoming calls from her parents while driving.

In some embodiments the focused driving application, in focused mode, may allow incoming and outgoing voice calls via Bluetooth® connections or the like. In this manner, even in focused driving mode the user may be able to have voice calls with certain parties when a device (e.g., a phone) is connected to a vehicle's Bluetooth® system (supporting hand's free conversation). These calls may still be limited to a pre-stored list of acceptable parties. In these embodiments, even if audio connections are supported when in focused driving mode.

In some embodiments a user may override the drive-focused mode, e.g., by entering a key or passphrase or the like. This override may be temporary and will allow the user or a passenger to use the device even though the device is being used while driving.

Figure 5I:
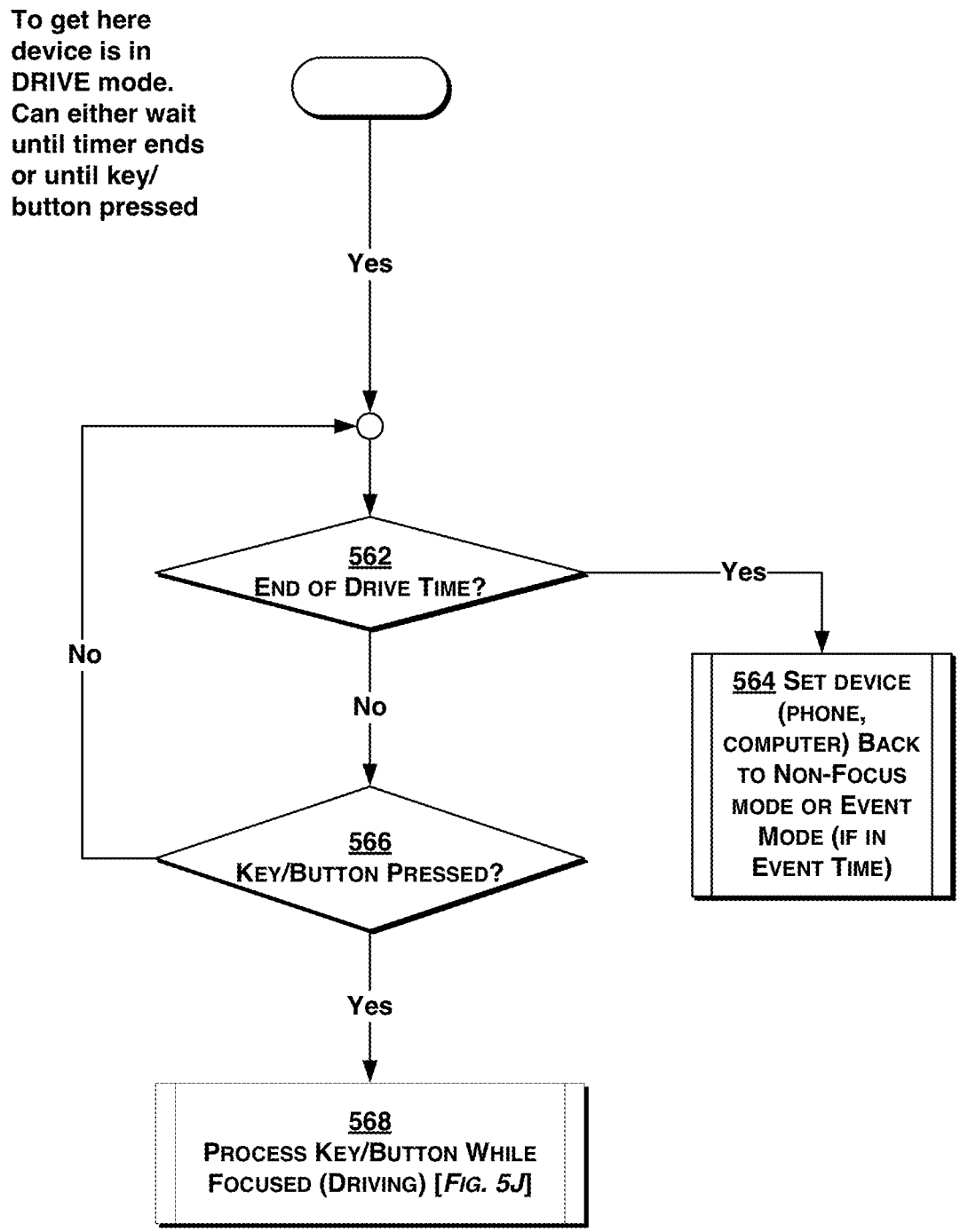

Exemplary operation of the focused driving application is described here with reference to the flowchart in FIG. 5I. In focused driving mode the application determines (at 562) if the drive time has ended (e.g., by comparing the current time to the end time for the current driving event). If the drive time has ended then (at 562) the device is set (at 564) to normal (non-focus mode) or, if during an event time, then to the mode corresponding to that event. If no drive time was set (e.g., the user chose to stay in drive focused mode until stopped), then the focused driving application determines (at 566) whether a key or button was pressed, and, if so, processes the key/button (at 568).

Figure 5J:
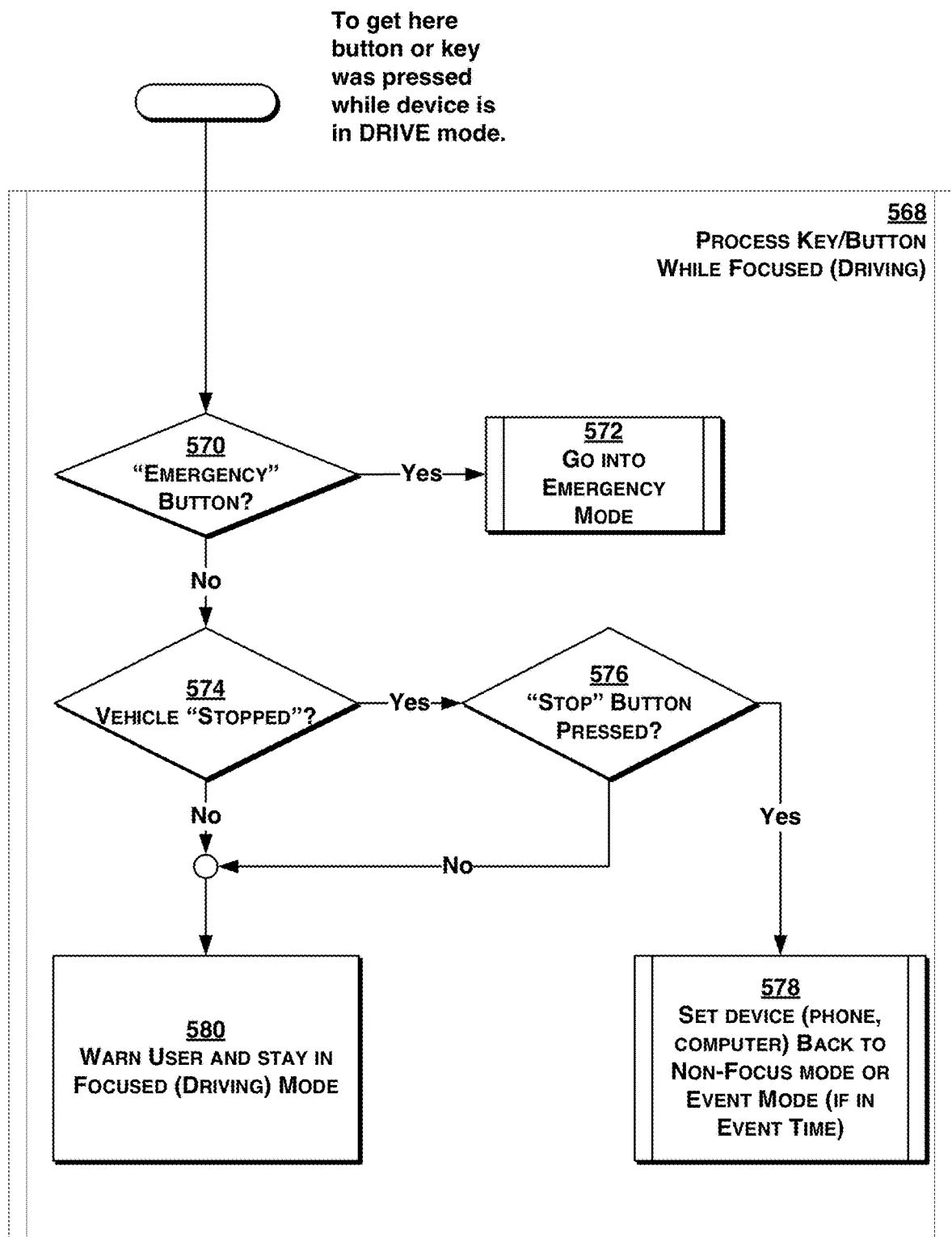

With reference now to the flowchart in FIG. 5J, when the user selects a key or button while in focused driving mode, if the user selected an "Emergency" button (at 570) then the device goes into an emergency mode (at 572). If the user did not select an "Emergency" button or key, then the device tries to determine (at 574) whether the vehicle has stopped. The device may use hardware (e.g., sensors) and software built into the device (e.g., accelerometers, GPS devices, etc.) to determine if the device is in motion. This information may be used to determine if the vehicle is in motion. In some embodiments hereof a vehicle is considered to be "stopped" (i.e., not driving) if it is substantially stationary for some predetermined period of time (e.g., 30 seconds, 1 minute, 90 seconds, etc.). This means that a vehicle that is briefly and temporarily stopped (e.g., in traffic or at a stop street) may not be considered "stopped" for the purposes of the focused driving application. Thus, as used herein, the condition of a vehicle being "stopped" may require that the vehicle not be moving for a period of time. In some cases, if the device resumes motion after being stopped, the motion may correspond to walking and not driving. The system may use sensors in the device (e.g., accelerometers and the like) to determine if the motion and speed of the device corresponds to walking rather than driving, and the device mode may be set accordingly.

If the vehicle is determined (at 574) to be stopped, then the application determines (at 576) whether the user pressed a "Stop" button (to terminate the focused-driving mode). If so (then the vehicle is stopped and the user pressed the "Stop" button) then (at 578) the application turns off the focused driving mode (the device is set to normal (non-focus mode) or, if during an event time, then to the mode corresponding to that event, similar to the processing at 564).

If (at 574) it is determined that the vehicle is not stopped then (at 580), regardless of what button or key was pressed, the device warns the user and stays in focused driving mode.

Tracking and Reporting

Embodiments hereof may include tracking and/or reporting mechanisms that may be used to keep track of a device's modes, e.g., by time and location. For example, the focus application(s) 226 may store (in focus data 228) the device's modes (e.g., "Normal", "Event Focused", "Driving Focused") by start and end time and by start and end location. The focus application(s) 226 may then report this information, e.g., by email or by posting it to another computer. In preferred embodiments the stored data may be locked to prevent unauthorized access, including unauthorized deletion.

Using the store/report feature, a user's focus information may be reported, e.g., to their parents. For example, a user's parents may be able to tell whether she was driving focused or whether the device was switched to normal mode while the user was driving.

User Interface

As described above, the focus application(s)/mechanism(s) 226, including the planner 220 and driving app 222, provide a user interface (UI), using, e.g., the UI application(s)/mechanism(s) 216. The UI is preferably appropriate for the computer device, so that the UI presented on a laptop computer may differ in form from the UI presented on a mobile phone.

A UI may be implemented, at least in part, on a device 100 using UI application(s) 216 on that device, and preferably uses the device's display(s) and input/interaction mechanism(s) (e.g., 114, FIG. 1C). Use of a UI may require selection of items, navigation between views, and input of information. Different devices may support different techniques for presentation of and user interaction with the UI. For example, a device with an integrated touch screen (e.g., device 100a as shown in FIG. 1A) may display UI information on the touch screen 102, and accept user input (for selection, input, etc.) using the touch screen (e.g., with a software/virtual keyboard—VKB—for some types of input). A device with an integrated screen, keyboard, and mouse (e.g., device 100b as shown in FIG. 1B) may display UI information on the screen 104, and accept user input using the hardware keyboard 106 and hardware mouse 108. If the screen/display 104 is also a touch screen display, then user interactions with the UI may use the screen instead of or in addition to the keyboard 106 and mouse 108. A device with separate components (e.g., some instances of device 100c of FIG. 1C) may display UI information on the display 112 and accept user input to the UI using input/interaction mechanism(s) 114 (e.g., the keyboard 116 and/or mouse 118 and/or gesture mechanism 120). The system hereof is not limited by the manner in which the UI is presented or implemented or by the manner in which user input is determined and made.

Example UI/UX

Figure 6A:
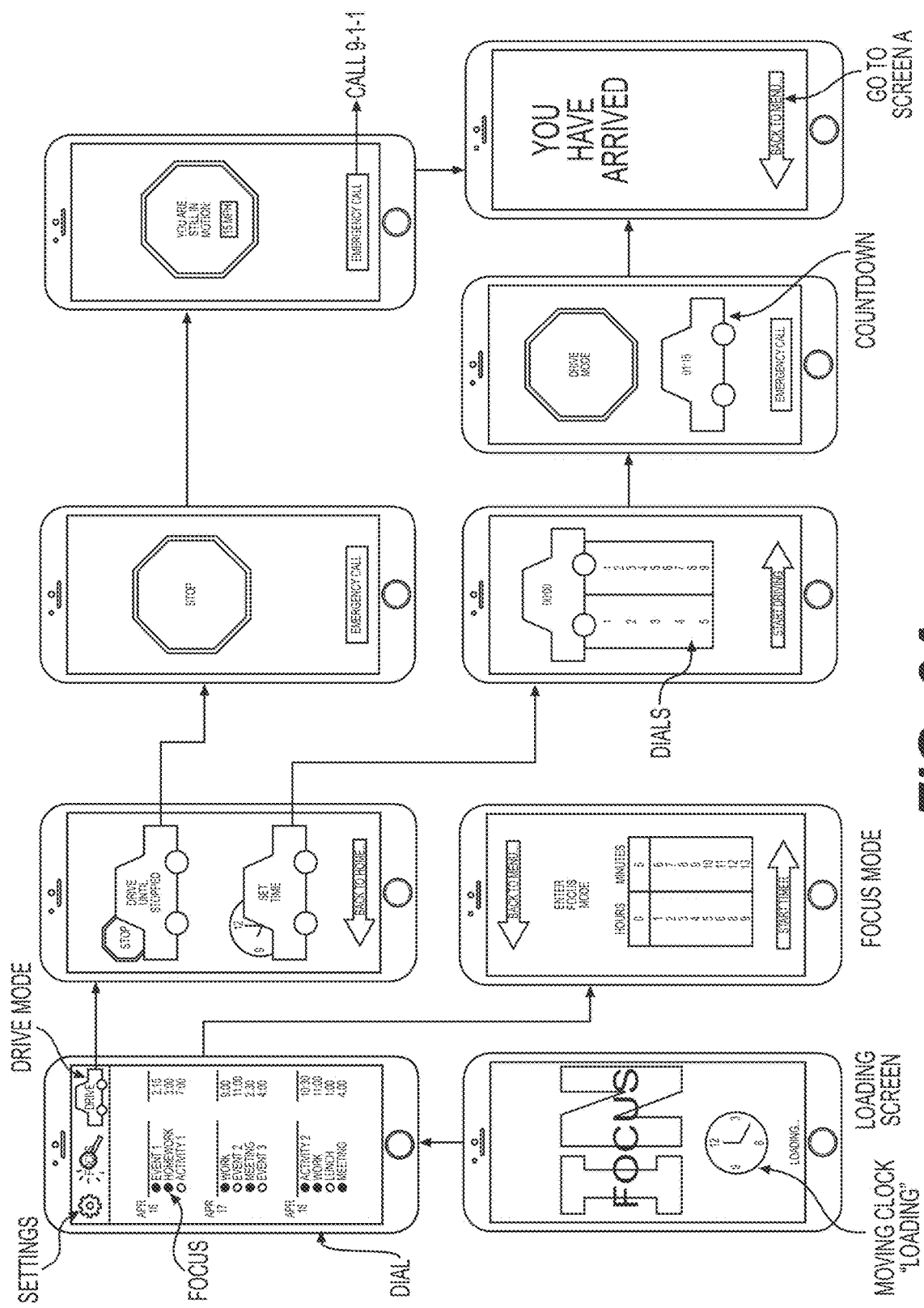
FIGS. 6A to 6K are example screenshots of aspects of a graphical user interface according to exemplary embodiments hereof.
Figure 6B:
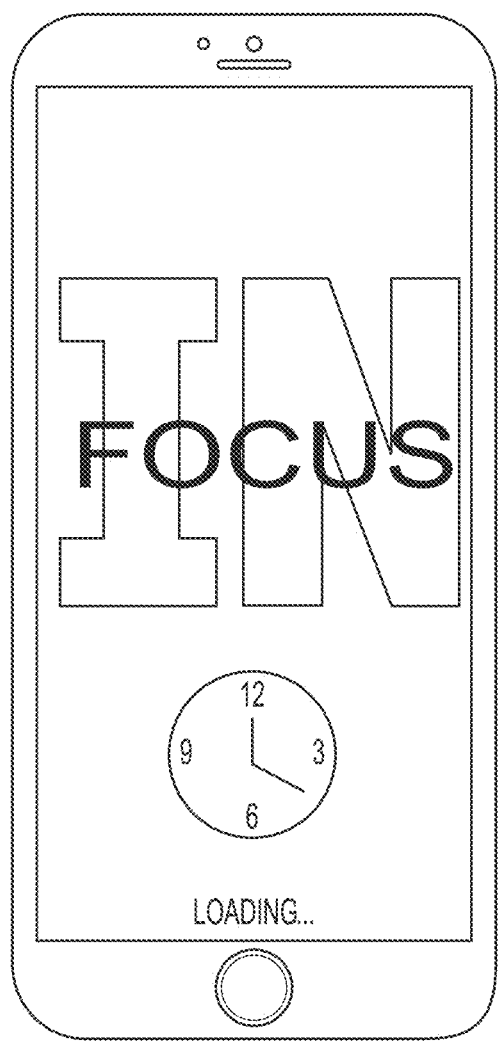
Figure 6C:
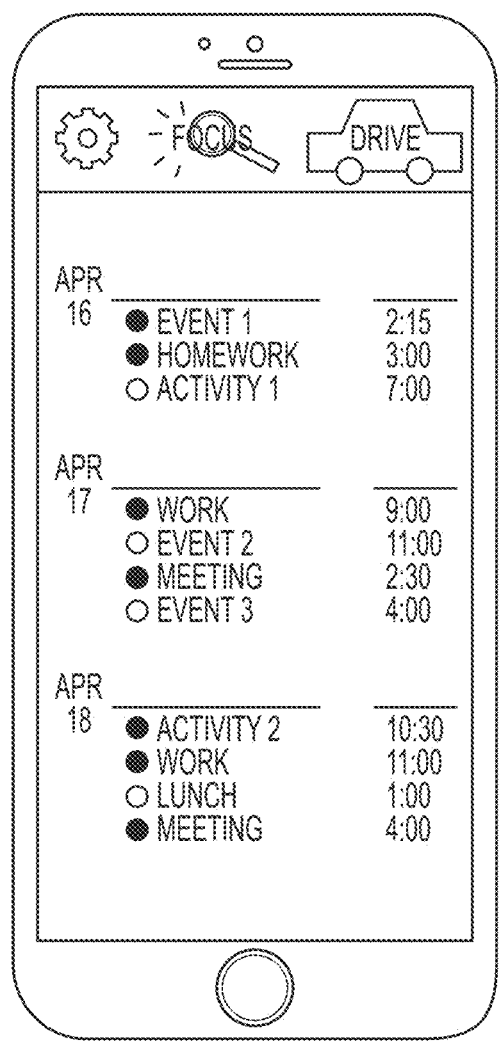
Figure 6D:
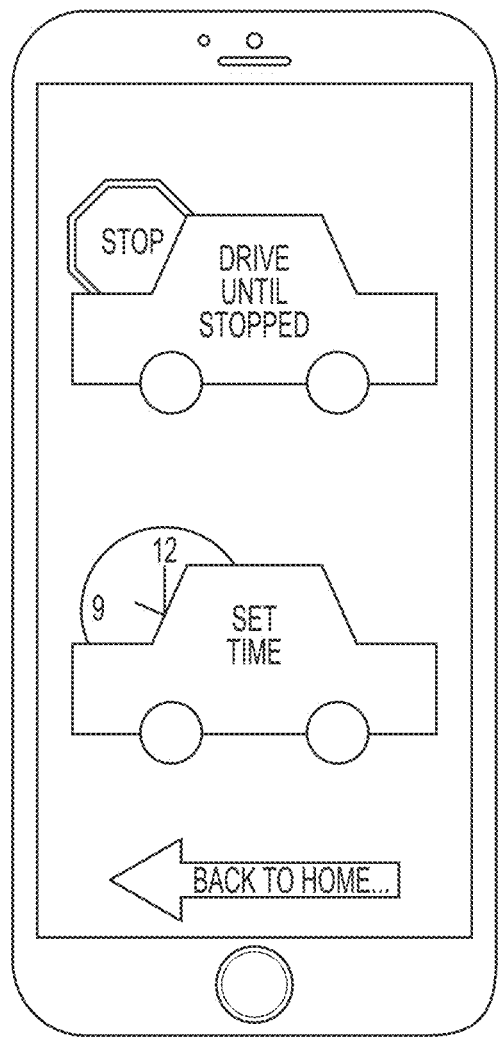
Figure 6E:
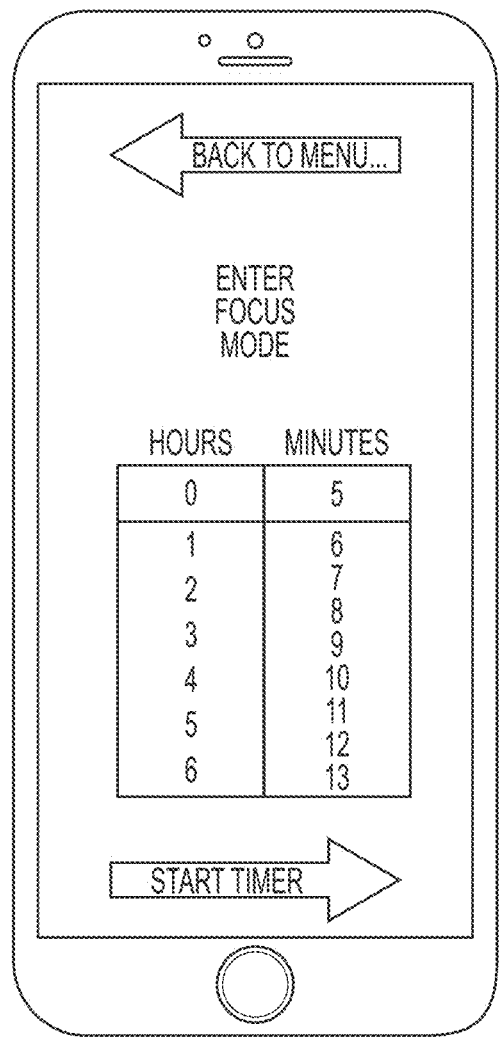
Figure 6F:
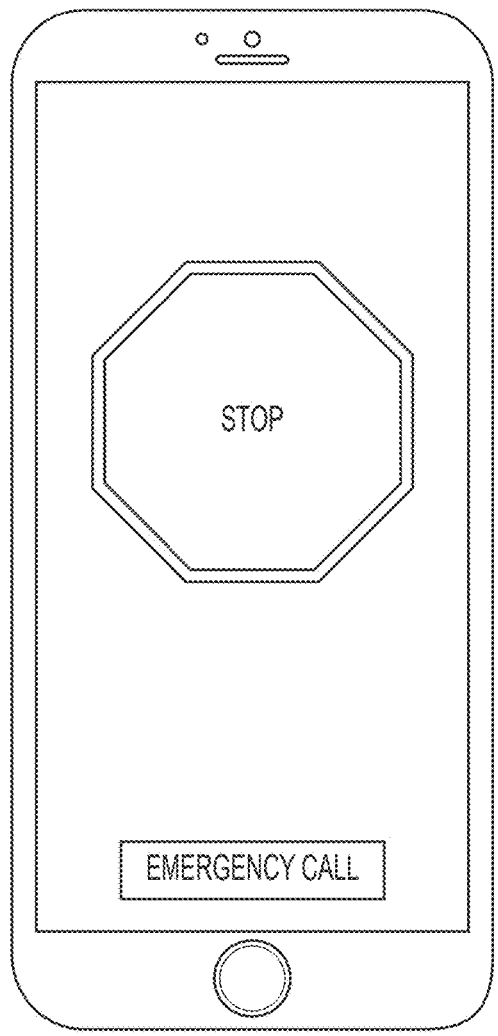
Figure 6G:
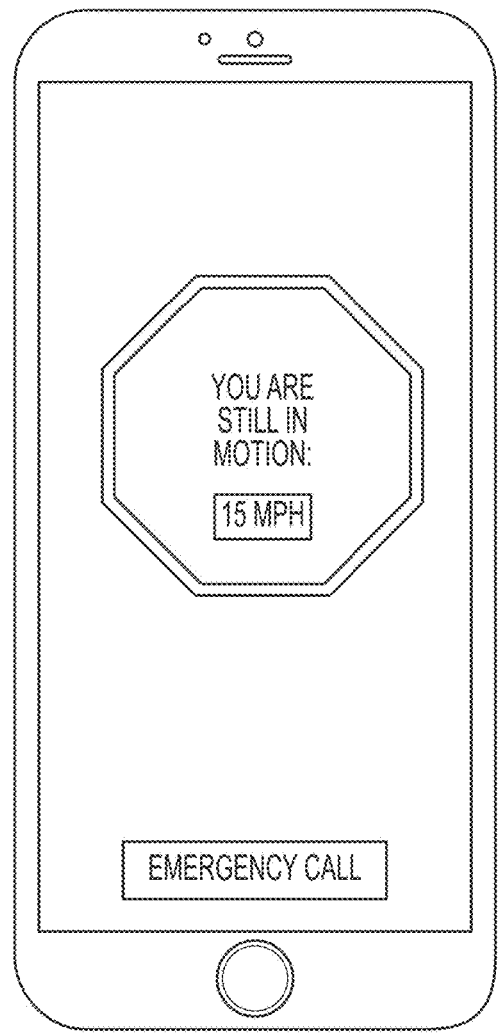
Figure 6H:
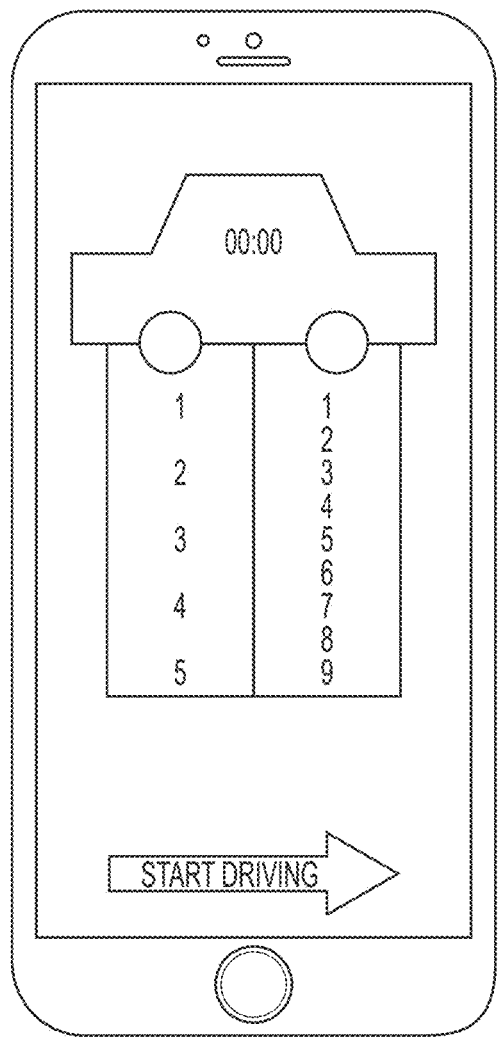
Figure 6I:
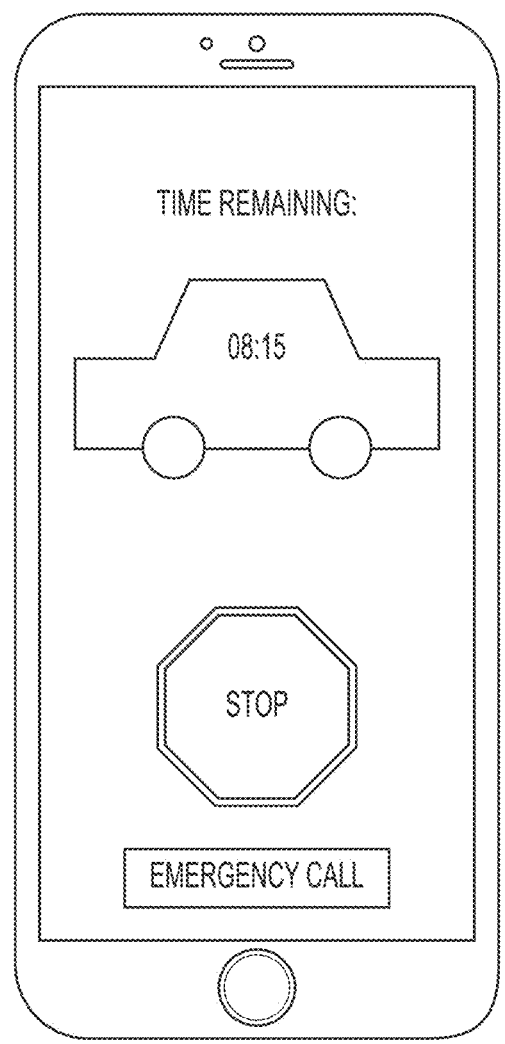

FIGS. 6A to 6I are example screenshots of aspects of a graphical user interface according to exemplary embodiments hereof, showing an exemplary UI and corresponding UX. FIG. 6A depicts a storyboard showing an exemplary UI for a focus app 226 that includes a planner 220 and a driving app 222. FIGS. 6B to 6I depicts some of the screens of FIG. 6A in greater detail.

As should be appreciated, the UI/UX shown in FIGS. 6B to 6I is merely an example, and different and/or other interface features are contemplated herein. In preferred implementations the driving (and other focus) modes are controlled via a control panel integrated into the device's OS. For example, as discussed below, in some exemplary embodiments hereof, the driving mode may be turned on and off using the control panel shown in FIGS. 6J and 6K.

Those of ordinary skill in the art will realize and appreciate, upon reading this description, that integrating the driving (or other focus) application into the device's OS allows for levels of control that may not be available to all applications running on the device. In particular, integrating the application with the device's OS and giving access via the device's control panel allows the focus (e.g., driving) application to control aspects of at least some integrated applications on the device. The integrated applications may include the chat application, the cellular communications applications, etc.

Implementation

Computing

The applications, services, mechanisms, operations and acts shown and described above are implemented, at least in part, by software running on one or more computers or computer systems or user devices (e.g., devices 100*a*, 100*b*, 100*c* in FIGS. 1A-1C, respectively). It should be appreciated that each user device is, or comprises, a computer system.

Programs that implement such methods (as well as other types of data) may be stored and transmitted using a variety of media (e.g., computer readable media) in a number of ways. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 7:
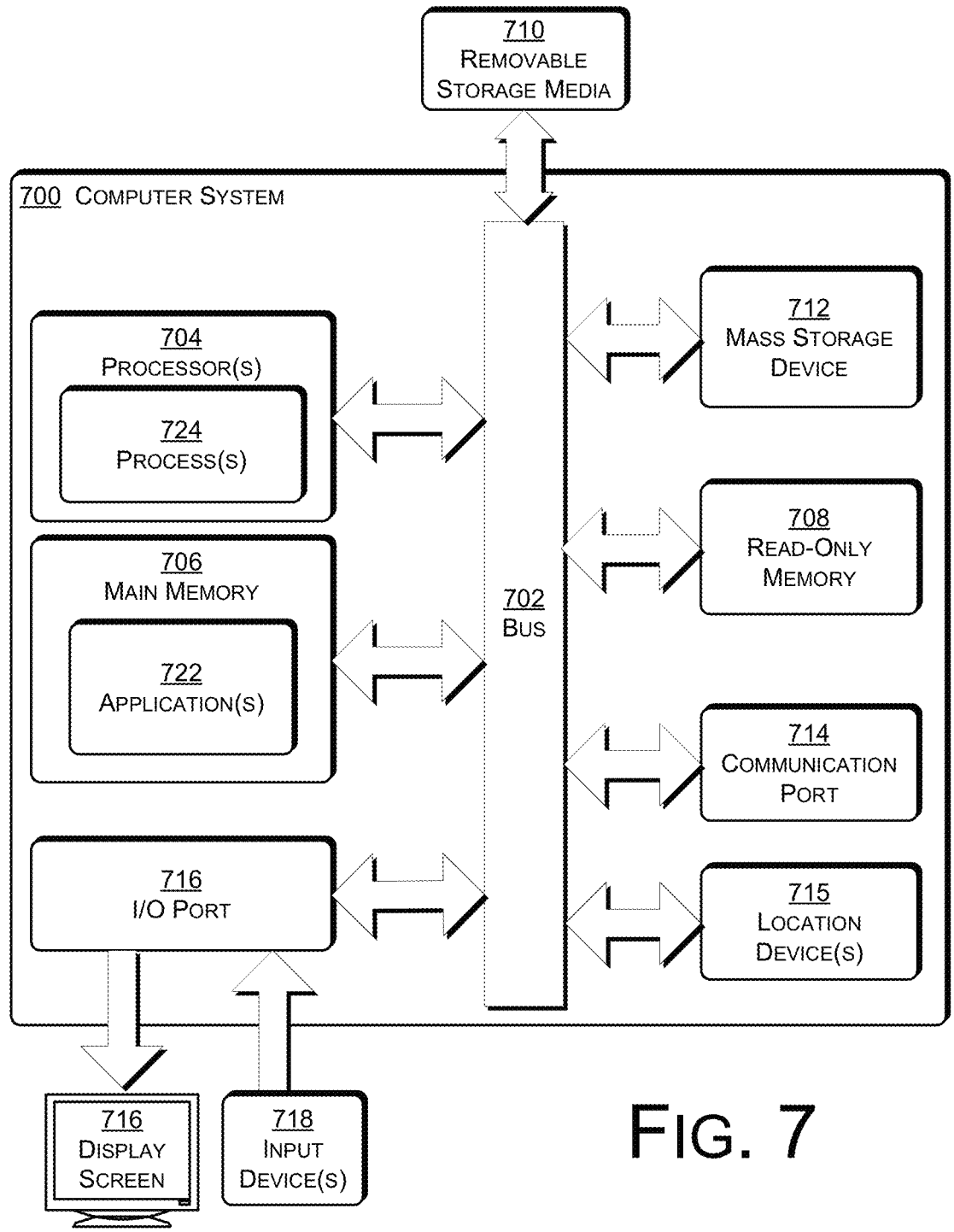
FIG. 7 depicts aspects of a computer system according to exemplary embodiments hereof.

FIG. 7 is a schematic diagram of a computer system 700 upon which embodiments of the present disclosure may be implemented and carried out.

According to the present example, the computer system 700 may include a bus 702 (i.e., interconnect), one or more processors 704, one or more communications ports 714, location device(s) 715, a main memory 706, optional removable storage media 710, read-only memory 708, and a mass storage 712. Communication port(s) 714 may be connected to one or more networks (e.g., computer networks, cellular networks, etc.) by way of which the computer system 700 may receive and/or transmit data. The location device(s) 715 may include GPS devices and the like that can be used to determine the location of the device.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 704 can be (or include) any known processor, such as, but not limited to, an Intel® Itanium® or Itanium 2® processor(s), AMD® Opteron® or Athlon MP® processor(s), or Motorola® lines of processors, and the like. Communications port(s) 714 can be any of an RS-232 port for use with a modem-based dial-up connection, a 10/100 Ethernet port, a Gigabit port using copper or fiber, or a USB port, and the like. Communications port(s) 714 may be chosen depending on a network such as a Local Area Network (LAN), a Wide Area Network (WAN), a Content Delivery Network (CDN), or any network to which the computer system 700 connects. The computer system 700 may be in communication with peripheral devices (e.g., display screen 716, input device(s) 718) via Input/Output (I/O) port 720. Some or all of the peripheral devices may be integrated into the computer system 700, and the input device(s) 718 may be integrated into the display screen 716 (e.g., in the case of a touch screen).

Main memory 706 can be Random Access Memory (RAM), or any other dynamic storage device(s) commonly known in the art. Read-only memory 708 can be any static storage device(s) such as Programmable Read-Only Memory (PROM) chips for storing static information such as instructions for processor(s) 704. Mass storage 712 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 702 communicatively couples processor(s) 704 with the other memory, storage and communications blocks. Bus 702 can be a PCI/PCI-X, SCSI, a Universal Serial Bus (USB) based system bus (or other) depending on the storage devices used, and the like. Removable storage media 710 can be any kind of external hard-drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g., sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 706 is encoded with application(s) 722 that support(s) the functionality as discussed herein (an application 722 may be an application that provides some or all of the functionality of one or more of the mechanisms described herein). Application(s) 722 (and/or other resources as described herein) can be embodied as software code such as data and/or logic instructions (e.g., code stored in the memory or on another computer readable medium such as a disk) that supports processing functionality according to different embodiments described herein.

For example, as shown in FIG. 2, application(s) 722 may include device applications 200). As shown, e.g., in FIG. 2, device application(s) 200 may include system/administrative application(s) 214, user interface (UI) application(s) 216, storage application(s) 218, planning application(s) 220, focused driving application(s) 222, and other miscellaneous application(s) 224.

During operation of one embodiment, processor(s) 704 accesses main memory 706, e.g., via the use of bus 702 in order to launch, run, execute, interpret or otherwise perform the logic instructions of the application(s) 722. Execution of application(s) 722 produces processing functionality of the service(s) or mechanism(s) related to the application(s). In other words, the process(es) 724 represents one or more portions of the application(s) 722 performing within or upon the processor(s) 704 in the computer system 700.

For example, process(es) 724 may include device process(es) corresponding to one or more of the device application(s) 722.

It should be noted that, in addition to the process(es) 724 that carries(carry) out operations as discussed herein, other embodiments herein include the application 722 (i.e., the un-executed or non-performing logic instructions and/or data). The application 722 may be stored on a computer readable medium (e.g., a repository) such as a disk or in an optical medium. According to other embodiments, the application 722 can also be stored in a memory type system such as in firmware, read only memory (ROM), or, as in this example, as executable code within the main memory 706 (e.g., within Random Access Memory or RAM). For example, application 722 may also be stored in removable storage media 710, read-only memory 708, and/or mass storage device 712.

Those skilled in the art will understand that the computer system 700 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

Integration

As should be appreciated, a so-called smartphone or cellular phone is essentially a mobile computing device, and the features, applications and mechanisms described herein may be implemented as mechanisms (e.g., software and/or hardware) running on such devices. Thus, e.g., the driving application may be an application running on a smartphone (e.g., an Android or an iPhone® or the like). Those of ordinary skill in the art will realize and appreciate, upon reading this description, that various aspects of the applications, including, specifically the focus applications, may be integrated into the operating system of the computing device. For example, the focused driving application may be integrated into the Google Android and Apple's iOS operating systems (OSs) ("iOS" refers to an operating system used for mobile devices manufactured by Apple Inc., "Android" is a mobile OS based on the Linux kernel and currently developed by Google, Inc.)

Figure 6J:
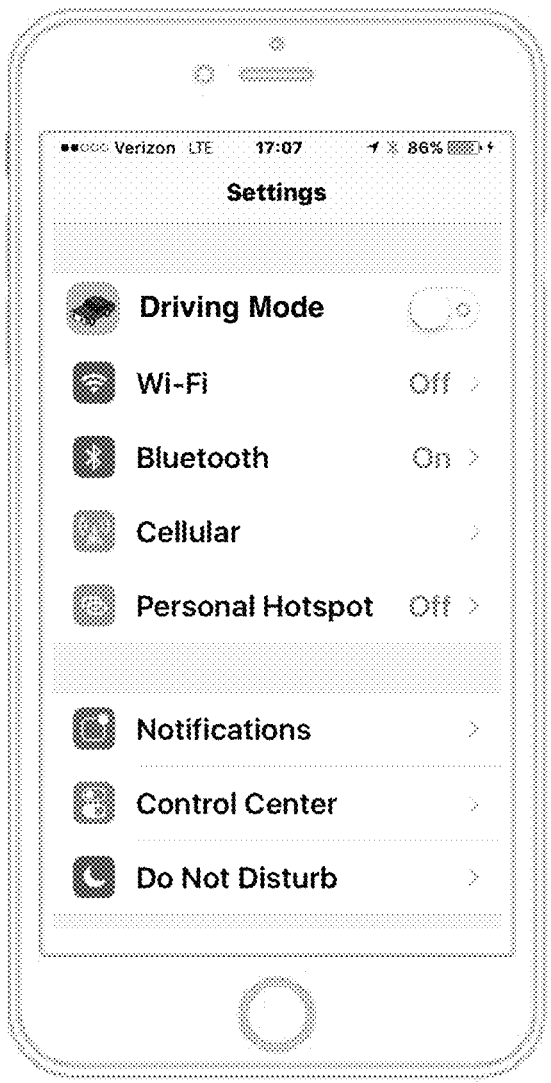
Figure 6K:
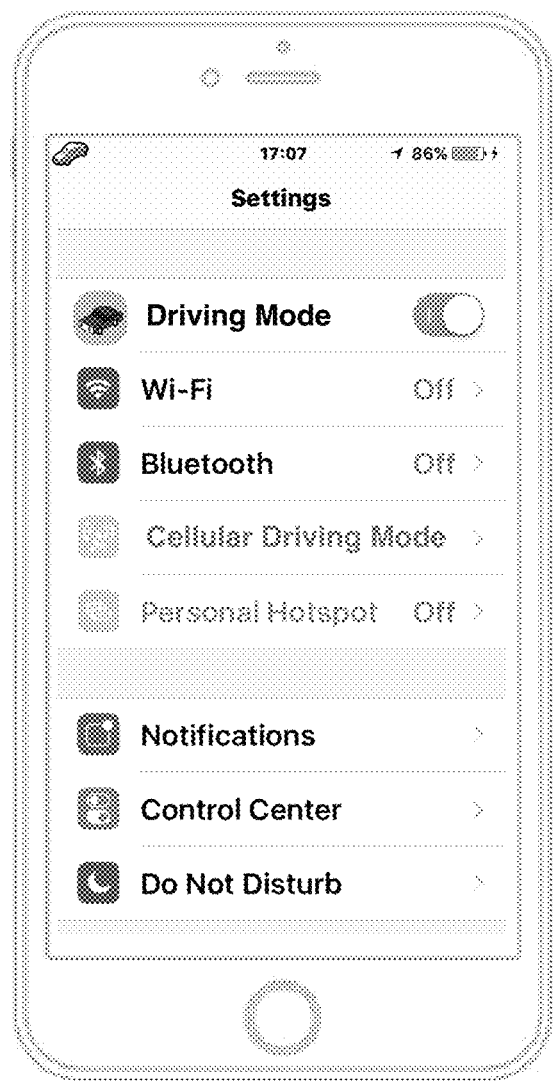

Such integration will enable the applications to run more efficiently and may allow them to take advantage of and possibly control lower-level operating system features. If the driving application is integrated into the OS of a device, then the user may be able to set the application's usage preferences via the device's control panel (e.g., as shown in FIGS. 6J-6K).

The focus application(s) may need to access features of the underlying OS via APIs provided by the device manufacturer. For example, in order to disable notifications or outgoing text messages, or to prevent use of various applications, the focus applications may require access to the device's APIs or to APIs not normally provided to applications provided by outside entities (i.e., by application developers other than the device manufacturer or OS provider).

In some aspects, the driving application may be integrated into the OS and turned on and off via a switch (e.g., a "Driving" mode switch, FIGS. 6J-6K) in the control panel (similar to the switch used to put a device into so-called "Airplane mode"). As shown in FIG. 6J, the device's control panel provides a switch (labeled "Driving mode") to turn on the driving application features. FIG. 6K shows the device's control panel with the "Driving Mode" turned on. As shown in FIG. 6K, with the driving mode turned on, the device may indicate that it is in driving mode (e.g., by an icon in the top left) as well as by notifying the user that the device is in "Cellular Driving Mode." A device configured according to exemplary embodiments hereof will also preferably include the "Airplane" mode switch (not shown in the drawings).

Vehicle Integration

Many vehicle manufacturers have integrated smartphone and other cellular functionality into vehicles. The focus application(s) described herein may be fully or partially integrated into vehicles to control some or all of the integrated smartphone functionality. When the focus application is integrated into a vehicle, in some embodiments, the focus application may be turned on when the vehicle is driving.

Many vehicles support device connectivity, whereby a smartphone or the like may connect to a cars audio system (e.g., using Bluetooth®). In some exemplary embodiments hereof, the driving application in a phone may be turned on automatically when the phone connects to a car's Bluetooth® system. When connected via a vehicle's Bluetooth® system, the driving application may allow cellular telephone calls while disabling or limiting other features (e.g., as described above).

In some other embodiments hereof, a user may configure the driving application to selectively turn on automatically when the phone connects to a car's Bluetooth® system. Preferably the driving application in a phone will only be automatically turned on when it connects to the Bluetooth® system to which the phone has previously connected.

Although aspects of vehicle integration are described with respect to the Bluetooth® protocol, those of ordinary skill in the art will realize and appreciate, upon reading this description, that different and/or other protocols may be used.

Those of ordinary skill in the art will realize and appreciate, upon reading this description, that the driving and focus mode switches and the driving and focus applications allow a device user to quickly put the device in an appropriate mode (e.g., driving and/or focused) without having to selectively adjust the device's settings each time a mode change is desired.

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. Unless specifically stated otherwise, a list may include duplicate items. For example, as used herein, the phrase "a list of XYZs" may include one or more "XYZs".

It should be appreciated that the words "first" and "second" in the description and claims are used to distinguish or identify, and not to show a serial or numerical limitation. Similarly, words such as "particular," "specific," "certain," and "given" if used, are to distinguish or identify within a claim and are not intended to be otherwise limiting. Furthermore, letter labels (e.g., "(B)", "(C)", "(D)", and so on, or "(a)", "(b)", and so on) and/or numbers (e.g., "(i)", "(ii)", and so on) if in the claims, are used to assist in readability, and are not intended to be otherwise limiting or to impose any serial or numerical limitations or orderings.

No ordering is implied by any of the labeled boxes in any of the flow diagrams unless specifically shown and stated. When disconnected boxes are shown in a diagram the activities associated with those boxes may be performed in any order, including fully or partially in parallel.

Thus are described methods, devices and systems supporting focused driving, working, and studying without distraction. While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

I claim:

1. A system in which a user has a plurality of devices associated therewith, wherein at least some of said devices include a plurality of modes, including at least one focus mode, and
wherein said devices include a first device having a first plurality of modes, including a first at least one focus mode,
wherein, when said first device is in said first at least one focus mode, a first one or more features of said first device are modified or at least partially disabled,
wherein,
in response to causing said first device to operate in a first focus mode, the system causes at least one other device associated with said user to operate in a corresponding focus mode, and
when said at least one other device is in said corresponding focus mode, one or more features of said at least one other device are modified or at least partially disabled,
wherein causing said first device to operate in said first focus mode, causes information about a current focus mode of the first device to be shared with said at least one other device associated with the user.

2. The system of claim 1, wherein modifying a focus mode on a device associated with said user causes a corresponding modification of said focus mode on at least one other device associated with said user.

3. The system of claim 1, wherein terminating a focus mode on a device associated with said user causes said focus mode to terminate on at least one other device associated with said user.

4. The system of claim 1, wherein said information is shared with said at least one other device associated with said user via a cloud account.

5. The system of claim 1, wherein said first focus mode is set in response to user selection of a region of a user interface of the first device.

6. The system of claim 5, wherein said user interface comprises a control panel integrated with an operating system of the first device.

7. The system of claim 6, wherein the control panel includes a focus button.

8. The system of claim 5, wherein the user interface supports selective termination of the focus mode.

9. The system of claim 8 wherein said user interface comprises a planner or scheduler.

10. The system of claim 1, wherein said first focus mode is set according to a schedule set by a user.

11. The system of claim 1, wherein said first device is a cellular phone, or a desktop computer, or a tablet computer, or a laptop computer, or a watch, and
wherein said at least one other device associated with said user is a cellular phone, or a desktop computer, or a tablet computer, or a laptop computer, or a watch.

12. The system of claim 1, wherein said first one or more features of said first device that are modified or at least partially disabled include one or more of:
(a1) notifications of one or more incoming calls on said first device; and/or
(b1) notifications of one or more incoming messages on said first device; and/or
(c1) one or more outgoing calls on said first device; and/or
(d1) one or more applications on said first device, and
wherein said one or more features of said at least one other device that are modified or at least partially disabled include one or more of:
(a2) notifications of one or more incoming calls on said at least one other device; and/or
(b2) notifications of one or more incoming messages on said at least one other device; and/or
(c2) one or more outgoing calls on said at least one other device; and/or
(d2) one or more applications on said at least one other device.

13. The system of claim 12 wherein the one or more applications comprise one or more of: one or more social networking applications; and/or one or more texting applications; and/or one or more browser applications; and/or one or more messaging applications; and/or one or more conferencing applications; and/or one or more photography applications.

14. The system of claim 1, wherein the first device is a communications device, and wherein the one or more features of said first device that are at least partially disabled in the focus mode include one or more features relating to cellular communications.

15. The system of claim 1, wherein one or more aspects of said first at least one focused mode are integrated with and/or implemented, at least in part, by an operating system of said first device.

16. The system of claim 1, wherein devices are maintained in a particular focus mode for a settable duration or until said particular focus mode is terminated by a user.

17. The system of claim 1, wherein the first plurality of modes includes a normal mode distinct from said first at least one focus mode, and wherein one or more features that are modified or at least partially disabled in said first at least one focus mode are not normally modified or disabled in said normal mode.

18. The system of claim 1 wherein at least one of said plurality of devices is at least partially integrated in a vehicle, a television, or a set-top box.

19. The system of claim 1, wherein the at least one focus mode includes a driving mode.

20. A system in which a user has a plurality of devices associated therewith, wherein at least some of said devices include a plurality of modes, including at least one focus mode, and
wherein said devices include a first device having a first plurality of modes, including a first at least one focus mode,
wherein, when said first device is in said first at least one focus mode, a first one or more features of said first device are modified or at least partially disabled,
and wherein,
in response to causing said first device to operate in a first focus mode, the system causes at least one other device associated with said user to operate in a corresponding focus mode, and
when said at least one other device is in said corresponding focus mode, one or more features of said at least one other device are modified or at least partially disabled,
wherein modifying a focus mode on a device associated with said user causes a corresponding modification of said focus mode on at least one other device associated with said user, and wherein terminating a focus mode on a device associated with said user causes said focus mode to terminate on at least one other device associated with said user,
wherein said causing said first device to operate in a first focus mode, causes information about a current focus mode of the first device to be shared with said at least one other device associated with the user via a cloud account,
wherein said first device is a cellular phone, or a desktop computer, or a tablet computer, or a laptop computer, or a watch, and
wherein said at least one other device associated with said user is a cellular phone, or a desktop computer, or a tablet computer, or a laptop computer, or a watch.

21. The system of claim 1, wherein the system causes at least one other device associated with said user to operate in a corresponding focus mode based at least in part on said information about a current focus mode of the first device.

22. A system in which a user has a plurality of devices associated therewith, said devices being associated via an account, and wherein at least some of said devices include a plurality of modes, including at least one focus mode, and
wherein said devices include a first device having a first plurality of modes, including a first focus mode,
wherein, when said first device is in said first focus mode, a first one or more features of said first device are modified or at least partially disabled,
wherein, in response to information about a current focus mode of the first device being shared with at least one other device associated with the user, the system causes said at least one other device associated with said user to operate in a focus mode corresponding to the current focus mode of the first device, and
when said at least one other device is in said corresponding focus mode, one or more features of said at least one other device are modified or at least partially disabled.

23. The system of claim 22, wherein the account is a cloud account, and wherein said information is shared with said at least one other device associated with said user via a cloud account.

24. The system of claim 22, wherein modifying a focus mode on a device associated with said user causes a corresponding modification of said focus mode on at least one other device associated with said user via said account.

25. The system of claim 22, wherein terminating a focus mode on a device associated with said user causes said focus mode to terminate on at least one other device associated with said user via said account.

26. The system of claim 22, wherein said first focus mode was set in response to user selection of a region of a user interface of the first device.

27. The system of claim 26, wherein said user interface comprises a control panel integrated with an operating system of the first device.

28. The system of claim 27, wherein the control panel includes a focus button.

29. The system of claim 26, wherein the user interface supports selective termination of the focus mode.

30. The system of claim 29 wherein said user interface comprises a planner or scheduler.

31. The system of claim 22, wherein said first focus mode is set according to a schedule set by a user.

32. The system of claim 22, wherein said first device is a cellular phone, or a desktop computer, or a tablet computer, or a laptop computer, or a watch, and wherein said at least one other device associated with said user is a cellular phone, or a desktop computer, or a tablet computer, or a laptop computer, or a watch, and wherein said first one or more features of said first device that are modified or at least partially disabled include one or more of:

(a1) notifications of one or more incoming calls on said first device; and/or (b1) notifications of one or more incoming messages on said first device; and/or (c1) one or more outgoing calls on said first device; and/or (d1) one or more applications on said first device, and wherein said one or more features of said at least one other device that are modified or at least partially disabled include one or more of:

(a2) notifications of one or more incoming calls on said at least one other device; and/or (b2) notifications of one or more incoming messages on said at least one other device; and/or (c2) one or more outgoing calls on said at least one other device; and/or (d2) one or more applications on said at least one other device, wherein the one or more applications comprise one or more of: one or more social networking applications; and/or one or more texting applications; and/or one or more browser applications; and/or one or more messaging applications; and/or one or more conferencing applications; and/or one or more photography applications.

33. The system of claim 22, wherein the one or more features of said first device that are at least partially disabled in the first focus mode include one or more features relating to cellular communications.

34. The system of claim 22, wherein one or more aspects of said first focused mode are integrated with and/or implemented, at least in part, by an operating system of said first device.

35. The system of claim 22, wherein devices associated with the user via the account are maintained in a particular focus mode for a settable duration or until said particular focus mode is terminated by a user.

36. The system of claim 22, wherein the first plurality of modes includes a normal mode distinct from said at least one focus mode, and wherein one or more features that are modified or at least partially disabled in said at least one focus mode are not normally modified or disabled in said normal mode.

37. The system of claim 22 wherein at least one of said plurality of devices is at least partially integrated with a vehicle, a television, or a set-top box.

38. The system of claim 22, wherein the at least one focus mode includes a driving mode.

* * * * *